United States Patent
Kang et al.

(10) Patent No.: US 11,800,334 B2
(45) Date of Patent: *Oct. 24, 2023

(54) APPARATUS AND METHOD FOR CONFIGURING AND MANAGING QUALITY OF SERVICE OF RADIO BEARER FOR DIRECT COMMUNICATION IN WIRELESS COMMUNICATION SYSTEM

(71) Applicant: SAMSUNG ELECTRONICS CO., LTD., Suwon-si (KR)

(72) Inventors: Hyunjeong Kang, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,427

(22) Filed: Jul. 19, 2022

(65) Prior Publication Data

US 2022/0353654 A1 Nov. 3, 2022

Related U.S. Application Data

(63) Continuation of application No. 16/777,730, filed on Jan. 30, 2020, now Pat. No. 11,425,543.

(30) Foreign Application Priority Data

Jan. 30, 2019 (KR) ........................ 10-2019-0011709

(51) Int. Cl.
*H04W 4/40* (2018.01)
*H04W 76/27* (2018.01)
(Continued)

(52) U.S. Cl.
CPC ............... *H04W 4/40* (2018.02); *H04W 4/06* (2013.01); *H04W 28/0268* (2013.01); *H04W 76/27* (2018.02); *H04W 92/18* (2013.01)

(58) Field of Classification Search
None
See application file for complete search history.

(56) References Cited

U.S. PATENT DOCUMENTS 9,980,173 B2   5/2018   Lee et al.
10,206,076 B2  2/2019   Chun et al.
(Continued)

FOREIGN PATENT DOCUMENTS

EP    3742832 A1       11/2020
WO    2016/200184 A1   12/2016
(Continued)

OTHER PUBLICATIONS

Qualcomm Incorporated, "Discussion on QoS design for NR PC5 communication", 3GPP TSG-RAN WG2 Meeting #104, Nov. 12-16, 2018, R2-1817776, 3 pages.

(Continued)

*Primary Examiner* — Diane L Lo

(57) ABSTRACT

The disclosure relates to a pre-5th-generation (5G) or 5G communication system to be provided for supporting higher data rates beyond 4th-generation (4G) communication system such as long term evolution (LTE). A method for operating a user equipment in a wireless communication system includes determining service information required by a vehicle to everything (V2X) application and determining a V2X transmission mode. The method also includes determining quality of service (QoS) information required by the V2X application and acquiring sidelink radio bearer configuration information corresponding to the QoS information. The method further includes transmitting and receiving a V2X packet of direct communication using the acquired sidelink radio bearer configuration information.

20 Claims, 24 Drawing Sheets

(51) Int. Cl.
*H04W 4/06* (2009.01)
*H04W 28/02* (2009.01)
*H04W 92/18* (2009.01)

(56) References Cited

U.S. PATENT DOCUMENTS

| | | | |
|---|---|---|---|
| 11,425,543 B2* | 8/2022 | Kang | H04W 76/14 |
| 2017/0013497 A1 | 1/2017 | Lee et al. | |
| 2018/0054237 A1 | 2/2018 | Tseng et al. | |
| 2018/0255499 A1 | 9/2018 | Loehr et al. | |
| 2019/0110175 A1 | 4/2019 | Chun et al. | |
| 2019/0239112 A1 | 8/2019 | Rao et al. | |
| 2019/0268918 A1 | 8/2019 | Baghel et al. | |
| 2020/0037132 A1 | 1/2020 | Wu et al. | |
| 2020/0084659 A1 | 3/2020 | Pan et al. | |
| 2020/0107218 A1 | 4/2020 | Wang et al. | |
| 2020/0113015 A1 | 4/2020 | Basu Mallick et al. | |
| 2020/0145799 A1 | 5/2020 | Baghel et al. | |
| 2020/0146094 A1 | 5/2020 | Wu et al. | |
| 2020/0163005 A1 | 5/2020 | Rao et al. | |
| 2020/0229198 A1 | 7/2020 | Kung et al. | |
| 2020/0236656 A1 | 7/2020 | Cao et al. | |
| 2020/0275502 A1 | 8/2020 | Chen et al. | |
| 2021/0051454 A1 | 2/2021 | Chou et al. | |
| 2021/0153065 A1 | 5/2021 | Adjakple et al. | |

FOREIGN PATENT DOCUMENTS

| | | | |
|---|---|---|---|
| WO | 2017076037 A1 | 5/2017 | |
| WO | 2018/016157 A1 | 1/2018 | |

OTHER PUBLICATIONS

OPPO, "Discussion on QoS for NR-V2X", 3GPP TSG-RAN WG2 Meeting #104, Nov. 12-16, 2018, R2-1816342, 5 pages.
Huawei, HiSilicon, "Radio bearer configuration and management for NR sidelink", 3GPP TSG-RAN WG2 Meeting #104, Nov. 12-16, 2018, R2-1816522, 5 pages.
International Search Report dated May 20, 2020 in connection with International Patent Application No. PCT/KR2020/001434, 3 pages.
Written Opinion of the International Searching Authority dated May 20, 2020 in connection with International Patent Application No. PCT/KR2020/001434, 5 pages.
European Patent Office, "Supplementary European Search Report" dated Feb. 22, 2022, in connection with European Patent Application No. 20749321.4, 12 pages.
ZTE et al., "Consideration on QoS management for NR V2X," Spokane, USA, Nov. 12-16, 2018, R2-1816988, 3GPP TSG-RAN WG2 #104, 4 pages.
3GPP TR 23.786 V1.1.0 (Jan. 2019) Technical Report; 3rd Generation Partnership Project; Technical Specification Group Services and System Aspects; Study on architecture enhancements for EPS and 5G System to support advanced V2X services (Release 16); 111 pages.
3GPP TR 22.886 V16.2.0 (Dec. 2018) Technical Report; 3rd Generation Partnership Project; Technical Specification Group Services and System Aspects; Study on enhancement of 3GPP Support for 5G V2X Services (Release 16); 76 pages.
3GPP TS 36.331 V15.4.0 (Dec. 2018) Technical Specification; 3rd Generation Partnership Project; Technical Specification Group Radio Network; Evolved Universal Terrestrial Radio Access (E-UTRA); Radio Resource Control (RRC); Protocol specification (Release 15); 933 pages.
Intellectual Property India, "Examination Report under sections 12 & 13 of the Patents Act" dated Mar. 17, 2022, in connection with Indian Patent Application No. 202117038319, 6 pages.
3GPP TS 22.186 V16.1.0 (Dec. 2018) Technical Specification; 3rd Generation Partnership Project; Technical Specification Group Services and System Aspects; Enhancement of 3GPP support for V2X scenarios; Stage 1 (Release 16); 18 pages.
"3rd Generation Partnership Project; Technical Specification Group Services and System Aspects; Enhancement of 3GPP support for V2X scenarios; Stage 1 (Release 16)", 3GPP TS 22.186 V16.2.0 (Jun. 2019), 18 pages.
"3rd Generation Partnership Project; Technical Specification Group Services and System Aspects; Service requirements for the 5G system; Stage 1 (Release 17)", 3GPP TS 22.261 V17.1 0 (Dec. 2019), 83 pages.

* cited by examiner

APPARATUS AND METHOD FOR CONFIGURING AND MANAGING QUALITY OF SERVICE OF RADIO BEARER FOR DIRECT COMMUNICATION IN WIRELESS COMMUNICATION SYSTEM

CROSS-REFERENCE TO RELATED APPLICATIONS

This application is a continuation of application Ser. No. 16/777,730, filed Jan. 30, 2020, which is based on and claims priority under 35 U.S.C. § 119 to Korean Patent Application No. 10-2019-0011709 filed on Jan. 30, 2019, in the Korean Intellectual Property Office, the disclosures of which are incorporated by reference herein in their entirety.

BACKGROUND

1. Field

Various embodiments of the disclosure relate generally to a wireless communication system. More particularly, the disclosure relates to an apparatus and a method for managing and configuring quality of service of a direct communication bearer in the wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, radio interface methods for providing services of various quality of service (QoS) requirements are discussed. For example, a direct communication scheme for a vehicle to everything (V2X) terminal is suggested. Further, various discussions are under way to shorten communication time, enhance reliability, and more efficiently support direct communication between terminals.

SUMMARY

To address the above-discussed deficiencies of the prior art, it is a primary aspect of the disclosure to provide an apparatus and a method for supporting vehicle communication service and data transmission which achieve high reliability and low-latency requirement by providing a direct communication scheme between terminals in a vehicle communication system.

According to various embodiments of the disclosure, a method for operating a user equipment in a wireless communication system may include determining a vehicle to everything (V2X) service requiring sidelink direct communication, determining quality of service (QoS) information requested by the corresponding service, and acquiring radio parameter configuration information required for the service. The method includes controlling, at a base station, sidelink V2X radio parameter configuration to satisfy QoS requirements of the V2X service using the sidelink direct communication. The method includes acquiring, at the base station, a QoS level required by the V2X service of the user equipment and controlling the corresponding radio parameter configuration for the sidelink V2X. Acquiring the radio parameter configuration information at the user equipment which transmits and receives the direct communication based V2X service includes transmitting QoS information of the service to the base station, acquiring the parameter configuration information of a radio bearer of the corresponding service, providing from the base station to the user equipment the parameter configuration information of the radio bearer corresponding to the QoS information as parameters, and acquiring the parameter configuration information of the radio bearer corresponding to the QoS information which is pre-configured at the user equipment.

According to various embodiments of the disclosure, an apparatus of a user equipment in a wireless communication system includes a transceiver for transmitting and receiving data and at least one processor functionally coupled with the transceiver. The at least one processor controls to, if determining that the user equipment is in base station coverage, determine V2X service information and QoS information required by a V2X service, and requests and receives radio bearer parameter configuration information corresponding to the QoS information from a base station. The at least one processor controls to, if determining that the user equipment is not in the base station coverage, determine V2X service information and QoS information required by a V2X service, and acquires pre-configured radio bearer parameter configuration information corresponding to the QoS information.

According to various embodiments of the disclosure, a method for operating a user equipment in a wireless communication system may include determining service information required by a V2X application, determining a V2X transmission mode, determining QoS information required by the V2X application, acquiring sidelink radio bearer configuration information corresponding to the QoS information, and transmitting and receiving a V2X packet of direct communication using the acquired sidelink radio bearer configuration information.

According to various embodiments of the disclosure, an apparatus of a user equipment in a wireless communication system includes a transceiver for transmitting and receiving data and at least one processor functionally coupled with the transceiver. The at least one processor may determine service information required by a V2X application, and determine a V2X transmission mode, determine QoS information required by the V2X application, acquire sidelink radio bearer configuration information corresponding to the QoS information, and transmit and receive a V2X packet of direct communication using the acquired sidelink radio bearer configuration information.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 12C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the disclosure are used for describing particular embodiments and are not intended to limit the scope of other embodiments. A singular form may include a plurality of forms unless it is explicitly differently represented. All the terms used herein, including technical and scientific terms, may have the same meanings as terms generally understood by those skilled in the art to which the disclosure pertains. Among terms used in the disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the disclosure.

In various embodiments of the disclosure to be described below, a hardware approach will be described as an example. However, since the various embodiments of the disclosure include a technology using both hardware and software, the various embodiments of the disclosure do not exclude a software-based approach.

Hereafter, the disclosure relates to an apparatus and a method for acquiring a configuration parameter of a sidelink radio bearer corresponding to quality of service (QoS) requirements of vehicle to everything (V2X) communication in a wireless communication system. Specifically, the disclosure provides a technique for satisfying a required QoS level for various V2X services based on the sidelink radio bearer configuration parameter acquisition method for sidelink direct communication between V2X terminals in the wireless communication system.

Terms indicating signals, terms indicating channels, terms indicating control information, terms indicating network entities, and terms indicating components of an apparatus, which are used in the following descriptions, are for the sake of explanations. Accordingly, the disclosure is not limited to the terms to be described, and may use other terms having technically identical meaning.

The disclosure describes various embodiments by using terms used in some communication standards (e.g., 3$^{rd}$ generation partnership project (3GPP)), which is merely an example for the explanations. Various embodiments of the disclosure may be easily modified and applied in other communication systems.

Figure 1:
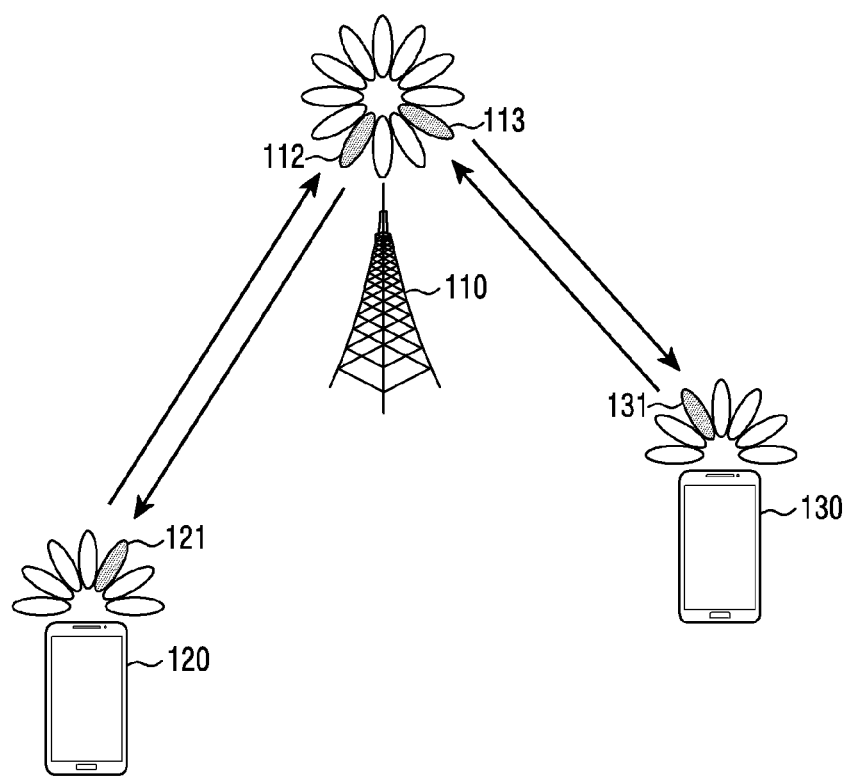
FIG. 1 illustrates a wireless communication system according to various embodiments of the disclosure.

FIG. 1 illustrates a wireless communication system according to various embodiments of the disclosure. FIG. 1 depicts a base station 110, a terminal 120, and a terminal 130, as some of nodes which use radio channels in the wireless communication system. While FIG. 1 depicts the single base station, other base station identical to or similar to the base station 110 may be further included. While FIG. 1 depicts only the two terminals, other terminal identical to or similar to the terminal 120 and the terminal 130 may be further included.

The base station 110 is a network infrastructure which provides radio access to the terminals 120 and 130. The base station 110 has coverage defined as a geographical area, based on a signal transmission distance. The base station 110 may be referred to as an access point (AP), an eNodeB (eNB), a 5th generation node (5G node), a 5G gNodeB (gNB), a wireless point, a transmission/reception point (TRP), or other term having a technically equivalent meaning.

The terminal 120 and the terminal 130 each are a device used by a user, and communicate with the base station 110 over the radio channel. In some cases, at least one of the terminal 120 and the terminal 130 may operate without user's involvement. That is, at least one of the terminal 120 and the terminal 130 performs machine type communication (MTC) and may not be carried by the user. The terminal 120 and the terminal 130 each may be referred to as a user equipment (UE), a mobile station, a subscriber station, a remote terminal, a wireless terminal, a user device, or other term having a technically equivalent meaning.

The base station 110, the terminal 120, and the terminal 130 may transmit and receive radio signals in a millimeter wave (mmWave) band (e.g., 28 GHz, 30 GHz, 38 GHz, 60 GHz). To improve a channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a receive signal. For doing so, the base station 110 and the terminals 120 and 130 may select serving beams 112, 113, 121, and 131 through beam search or beam management. After the serving beams 112, 113, 121, and 131 are selected, communications may be performed using resources which are quasi co-located (QCL) with resources which carry the serving beams 112, 113, 121, and 131.

If large-scale properties of a channel which carries a symbol on a first antenna port may be inferred from a channel which carries a symbol on a second antenna port, the first antenna port and the second antenna port may be said to be QCL. For example, the large-scale properties may include at least one of delay spread, Doppler spread, Doppler shift, average gain, average delay, and spatial receiver parameter.

Figure 2:
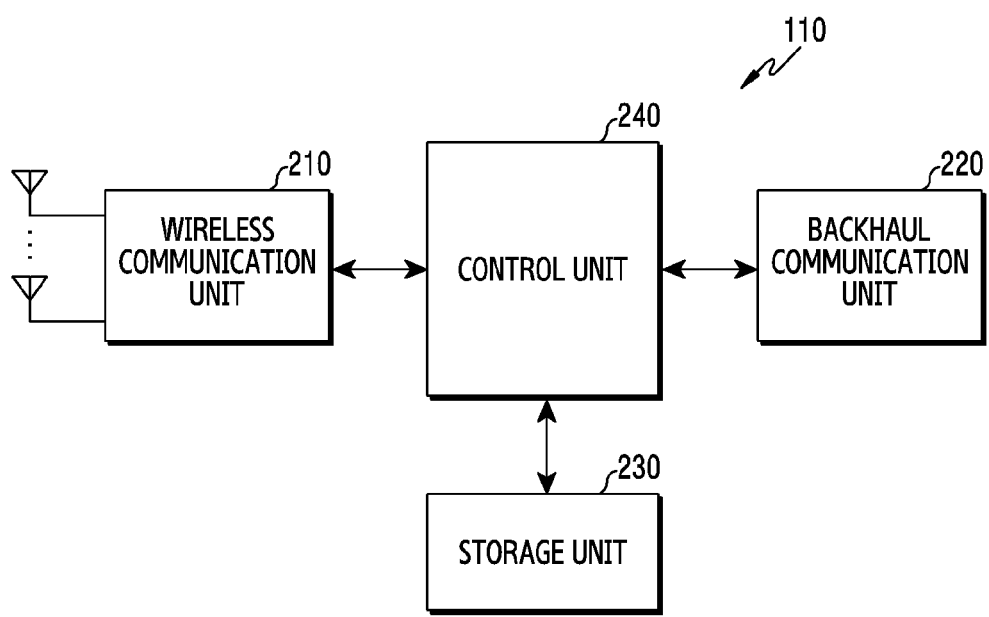
FIG. 2 illustrates a block diagram of a base station in a wireless communication system according to various embodiments of the disclosure.

FIG. 2 illustrates a configuration of a base station in a wireless communication system according to various embodiments of the disclosure. The configuration of FIG. 2 may be understood as the configuration of the base station 110. A term such as 'portion' or '~er' indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may transmit and receive signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal.

Also, the wireless communication unit 210 up-converts the baseband signal to a radio frequency (RF) band signal, transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and the like. In addition, the wireless communication unit 210 may include a plurality of transmit and receive paths. Further, the wireless communication unit 210 may include at least one antenna array including a plurality of antenna elements.

In view of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As such, the wireless communication unit 210 transmits and receives the signals. Hence, whole or part of the wireless communication unit 210 may be referred to as a transmitter, a receiver, or a transceiver. In the following, the transmission and the reception over the radio channel embrace the above-stated processing of the wireless communication unit 210.

The backhaul communication unit 220 provides an interface for communicating with other nodes in the network. That is, the backhaul communication unit 220 converts a bit string transmitted from the base station to another node, for example, to another access node, another base station, an upper node, or a core network, to a physical signal, and converts a physical signal received from the other node to a bit string.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data in response to a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. According to other embodiment, the protocol stack may be included in the wireless communication unit 210. For doing so, the control unit 240 may include at least one processor.

According to various embodiments, the control unit 240 may transmit radio resource control (RRC) configuration information to the terminal 110. The control unit 240 may transmit sidelink configuration information to the terminal 110. For example, the control unit 240 may control the base station to carry out operations to be explained according to various embodiments.

Figure 3:
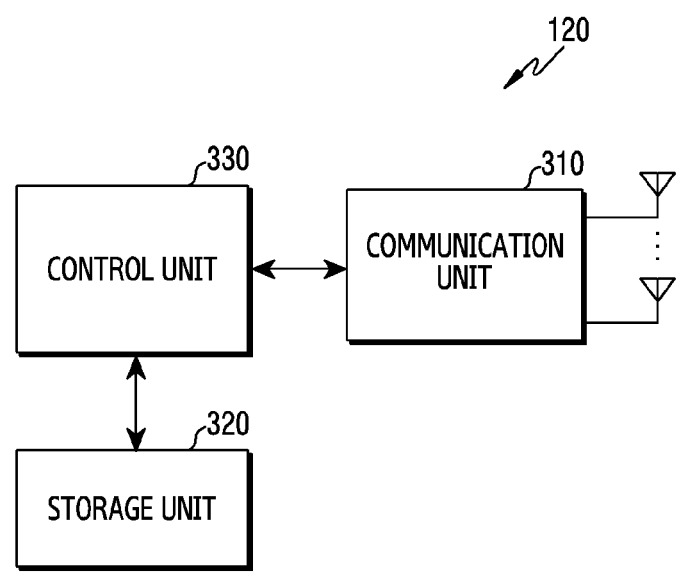
FIG. 3 illustrates a block diagram of a user equipment (UE) in a wireless communication system according to various embodiments of the disclosure.

FIG. 3 illustrates a configuration of a terminal in a wireless communication system according to various embodiments of the disclosure. The configuration of FIG. 3 may be understood as the configuration of the terminal 120 or the terminal 130. A term such as 'portion' or '~er' indicates a unit for processing at least one function or operation, and may be implemented using hardware, software, or a combination of hardware and software.

Referring to FIG. 3, the terminal includes a communication unit 310, a storage unit 320, and a control unit 330.

The communication unit 310 may transmit and receive signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In view of the hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

The communication unit 310 may include different communication modules for processing signals of different frequency bands. Further, the communication unit 310 may include a plurality of communication modules for supporting different radio access technologies. For example, different radio access technologies may include Bluetooth low energy (BLE), wireless fidelity (Wi-Fi), WiFi Gigabyte (WiGig), and a cellular network (e.g., Long Term Evolution (LTE)). Different frequency bands may include a super high frequency (SHF) (e.g., 2.5 GHz, 5 GHz) band and a millimeter weave (e.g., 38 GHz, 60 GHz) band.

As such, the communication unit 310 transmits and receives the signals. Hence, whole or part of the communication unit 310 may be referred to as a transmitter, a receiver, or a transceiver. Hereafter, the transmission and the reception over the radio channel embrace the above-stated processing of the communication unit 310.

The storage unit 320 stores a basic program for operating the terminal, an application program, and data such as setting information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the terminal. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. Part of the communication unit 310 and the control unit 330 may be referred to as a communication processor (CP).

According to various embodiments, if the terminal 120 performs sidelink direct communication with other terminal, the control unit 330 may perform determining at the terminal 120 service information required by a V2X application, determining a V2X transmission mode (unicast, groupcast, broadcast), determining QoS information of the V2X service, obtaining sidelink radio bearer configuration information corresponding to the QoS information from the base station, and transmitting and receiving V2X packets of the direct communication using the obtained sidelink radio bearer configuration information. For example, the control unit 330 may control the terminal to carry out operations, to be explained, according to various embodiments.

Figure 4A:
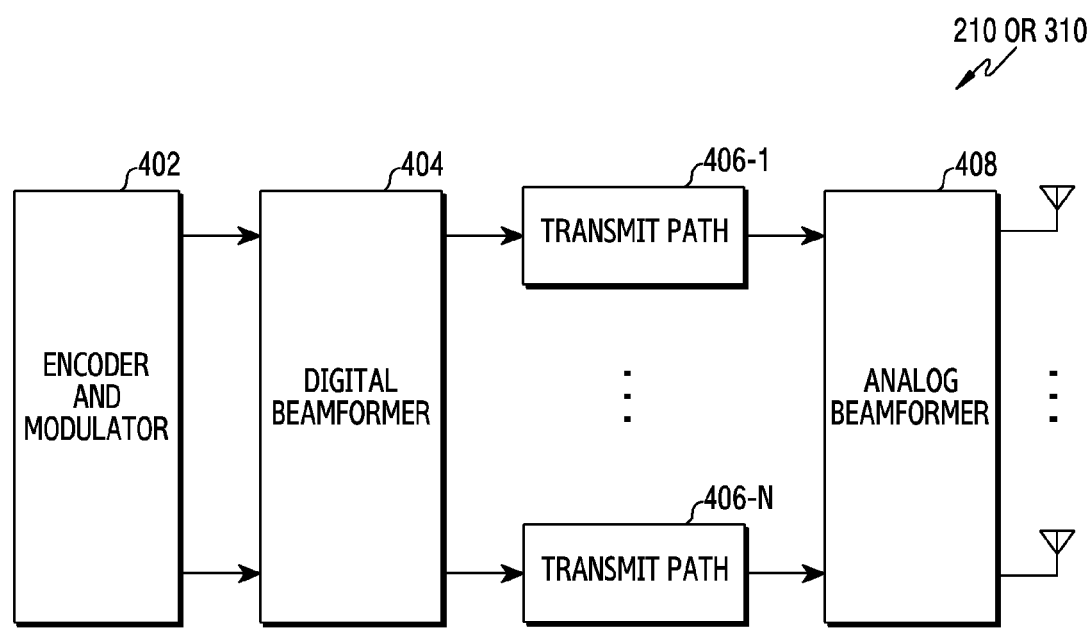
FIG. 4A illustrates a block diagram of a communication unit in a wireless communication system according to various embodiments of the disclosure.
Figure 4B:
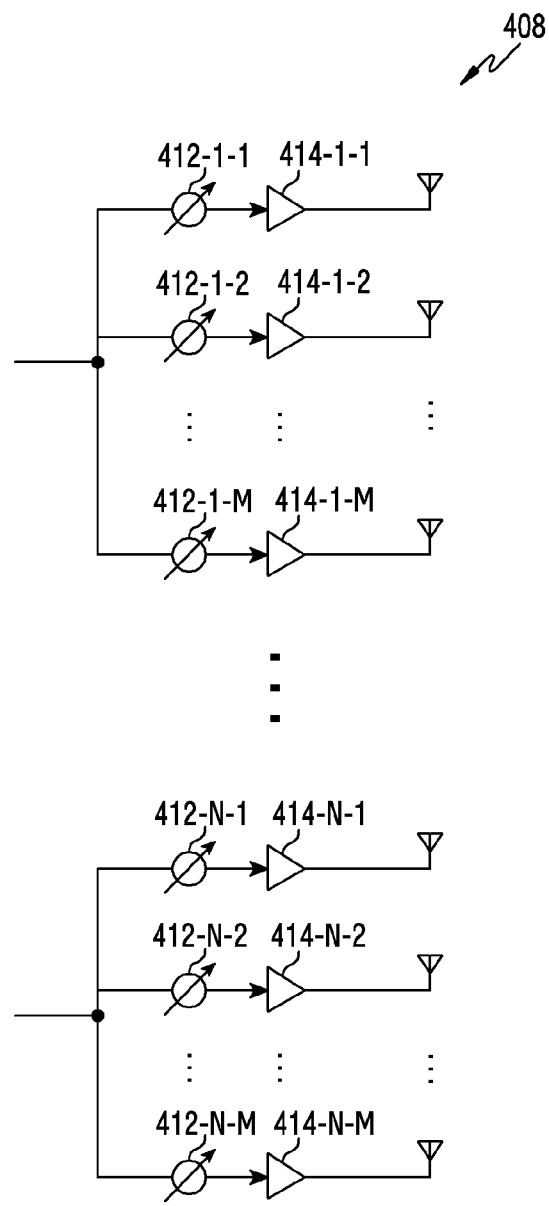
FIG. 4B illustrates a block diagram of the communication unit in the wireless communication system according to various embodiments of the disclosure.
Figure 4C:
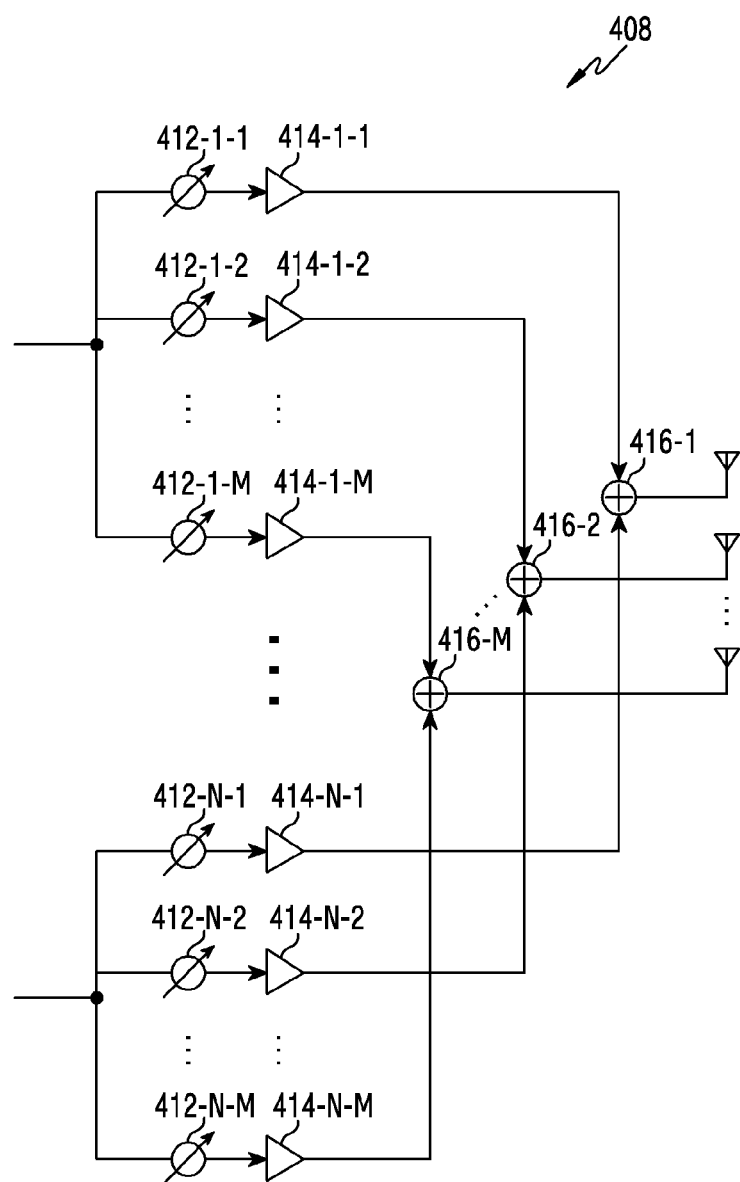
FIG. 4C illustrates a block diagram of the communication unit in the wireless communication system according to various embodiments of the disclosure.

FIGS. 4A, 4B, and 4C illustrate a configuration of a communication unit in a wireless communication system according to various embodiments of the disclosure. FIGS. 4A, 4B, and 4C depict a detailed configuration of the wireless communication unit 210 of FIG. 2 or the communication unit 310 of FIG. 3. More specifically, FIGS. 4A, 4B, and 4C depict components for performing the beamforming, as part of the wireless communication unit 210 of FIG. 2 or the communication unit 310 of FIG. 3.

Referring to FIG. 4A, the wireless communication unit 210 or the communication unit 310 includes an encoder and modulator 402, a digital beamformer 404, a plurality of transmit paths 406-1 through 406-N, and an analog beamformer 408.

The encoder and modulator 402 performs channel encoding. For the channel encoding, at least one of low density parity check (LDPC) code, convolution code, and polar code may be used. The encoder and modulator 402 generates modulation symbols through constellation mapping.

The digital beamformer 404 beamforms a digital signal (e.g., the modulation symbols). For doing so, the digital beamformer 404 multiplies the modulation symbols by beamforming weights. Herein, the beamforming weights are used to change an amplitude and a phase of the signal, and may be referred to as a precoding matrix or a precoder. The digital beamformer 404 outputs the digital-beamformed modulation symbols to the transmit paths 406-1 through 406-N. In so doing, according to multiple input multiple output (MIMO) transmission, the modulation symbols may be multiplexed or the same modulation symbols may be fed to the transmit paths 406-1 through 406-N.

The transmit paths 406-1 through 406-N convert the digital-beamformed digital signals to analog signals. For doing, the transmit paths 406-1 through 406-N each may include an inverse fast fourier transform (IFFT) operator, a cyclic prefix (CP) adder, a DAC, and an up-converter. The CP adder is used for orthogonal frequency division multiplexing (OFDM) and may be excluded if another physical layer scheme (e.g., filter bank multi-carrier (FBMC)) is applied. That is, the transmit paths 406-1 through 406-N provide an independent signal process for a plurality of streams generated through the digital beamforming. Notably, depending on the implementation, some of the components of the transmit paths 406-1 through 406-N may be used in common.

The analog beamformer 408 beamforms the analog signals. For doing so, the digital beamformer 404 multiplies the analog signals by the beamforming weights. Herein, the beamforming weights are used to change the amplitude and the phase of the signal. More specifically, the analog beamformer 408 may be configured as shown in FIG. 4B or FIG. 4C, according to a connection structure between the transmit paths 406-1 through 406-N and the antennas.

Referring to FIG. 4B, signals inputted to the analog beamformer 408 are converted in phase/amplitude, amplified, and then transmitted via the antennas. In so doing, signals of each path are transmitted via different antenna sets, that is, antenna arrays. Signals inputted in a first path are converted by phase/amplitude converters 412-1-1 through 412-1-M to signal strings having different or the same phase/amplitude, amplified by amplifiers 414-1-1 through 414-1-M, and then transmitted via the antennas.

Referring to FIG. 4C, signals inputted to the analog beamformer 408 are converted in phase/amplitude, amplified, and then transmitted via antennas. In so doing, signals of each path are transmitted via the same antenna set, that is, the same antenna array. Signals inputted in the first path are converted by the phase/magnitude converters 412-1-1 through 412-1-M to signal strings having different or the same phase/amplitude, and amplified by the amplifiers 414-1-1 through 414-1-M. To transmit via a single antenna array, the amplified signals are summed by adders 416-1-1 through 416-1-M based on the antenna element and then transmitted via the antennas.

The independent antenna array is used per transmit path in FIG. 4B, and the transmit paths share the single antenna array in FIG. 4C. However, according to another embodiment, some transmit paths may use the independent antenna array, and the rest transmit paths may share one antenna array. Further, according to yet another embodiment, by applying a switchable structure between the transmit paths and the antenna arrays, a structure which adaptively changes according to a situation may be used.

The V2X service may be divided into a basic safety service and an advanced service. The basic safety service may correspond to a vehicle notification service (cooperative awareness message (CAM) or basic safety message (BSM)) and specific services such as a left-turn notification service, a forward collision warning service, an emergency vehicle approaching notification service, a frontal obstacle warning service, an intersection signal information service, and may transmit and receive V2X information using the broadcast, unicast, or groupcast transmission. The advanced service not only strengthens QoS requirements more than the basic safety service but also requires a method for transmitting and receiving V2X information using the unicast and groupcast transmission besides the broadcast transmission so as to transmit and receive the V2X information in a specific vehicle group or transmit and receive the V2X information between two vehicles. The advanced service may correspond to specific services such as a platooning service, an autonomous driving service, a remote driving service, an extended sensor-based V2X service.

For the V2X service, a UE in a ng-radio access network (RAN) (gNB) connected to a 5G core network or an evolved universal terrestrial radio access network (E-UTRAN) (ng-eNB) connected to the 5G core network may perform the V2X service via the ng-RAN or the E-UTRAN. In other embodiment, if the base station (ng-RAN or ng-eNB) is connected to an evolved packet core (EPC) network, the V2X service may be performed via the base station. In other embodiment, if the base station (eNB) is connected to the EPC network, the V2X service may be performed via the base station. In so doing, a V2X radio interface communication scheme available for direct communication between UEs is at least one of the unicast, the groupcast, and the broadcast, and each communication scheme needs to provide a method for managing and configuring a radio communication parameter appropriate for QoS requirements of the V2X service in the V2X transmission and reception.

A direct communication system between UEs based on LTE wireless communication defines that a TX UE selects and manages a parameter required for the transmission. The LTE wireless communication transmits a V2X service message for the basic safety in the direct communication between UEs, wherein QoS requirements of the basic safety V2X service are not strict and, though the basic safety service is various, the QoS requirements between the services are not various and are not differentiated notably. Hence, in a mode for scheduling radio resources for the direct communication between UEs based on the LTE wireless communication, the base station schedules the radio resources without having to acquire specific QoS requirement information of the V2X service and the UE arbitrarily manages and configures the parameter.

The advanced V2X service has various QoS requirements and a required QoS level differs per V2X service. A particular advanced V2X service may be provided by configuring the radio resources and the radio parameter for the direct communication so as to satisfy the strict QoS requirements of the service. Thus, the direct communication system between UEs for supporting the advanced V2X service needs to provide a method for guaranteeing the QoS of the service, compared to a conventional system. In a mode in which the base station schedules the radio resources for the direct communication, the base station needs to perform an appropriate scheduling for a required level by acquiring detailed QoS information of the V2X service of the UE.

The disclosure provides a method for determining QoS information corresponding to a sidelink radio access bearer for vehicle-to-vehicle direct communication required in the basic safety service and the advanced service, and acquiring a configuration parameter corresponding to the QoS information according to various embodiments.

FIG. 5 illustrates a situation of direct communication between UEs using sidelink RAT according to various embodiments.

Figure 5A:
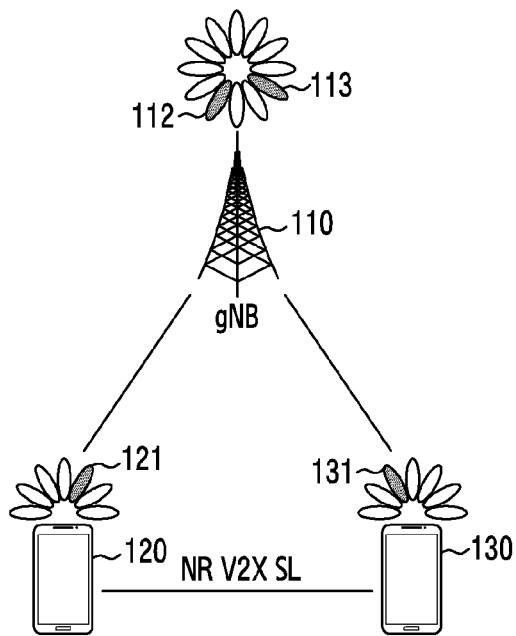
FIG. 5A illustrates a situation of direct communication between UEs using sidelink radio access technology (RAT) according to various embodiments.

FIG. 5A illustrates a scenario in which UEs performs the direct communication in gNB coverage. In FIG. 5A, sidelink radio bearer configuration parameter information to be used for V2X packet transmission and reception based the unicast, the broadcast, or the groupcast between the UEs may be transmitted or pre-configured through a system information message or an RRC dedicated message of the gNB. The UE which performs the direct communication may transmit QoS information corresponding to the V2X service to the base station and acquire the sidelink radio bearer configuration parameter information from the base station. The UE which performs the direct communication may determine QoS information corresponding to the V2X service, arbitrarily configure some configuration parameter of the sidelink radio bearer and acquire some configuration parameter from the pre-configured information.

Figure 5B:
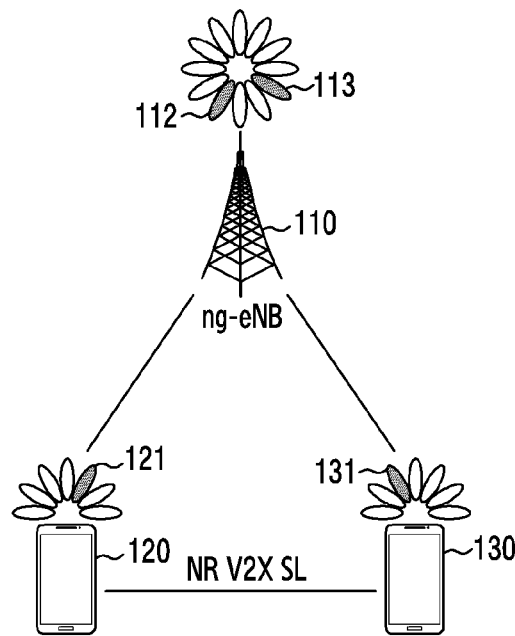
FIG. 5B illustrates a situation of the direct communication between the UEs using the sidelink RAT according to various embodiments.

FIG. 5B illustrates a scenario in which UEs in ng-eNB coverage performs the direct communication. In FIG. 5B, sidelink radio bearer configuration parameter information to be used for V2X packet transmission and reception based the unicast, the broadcast, or the groupcast between the UEs may be transmitted through a system information message or an RRC dedicated message of the ng-eNB or pre-configured. The UE which performs the direct communication may transmit QoS information corresponding to the V2X service to the ng-eNB and acquire the sidelink radio bearer configuration parameter information from the base station. The UE which performs the direct communication may determine QoS information corresponding to the V2X service, arbitrarily configure some configuration parameter of the sidelink radio bearer and acquire some configuration parameter from the pre-configured information.

Figure 5C:
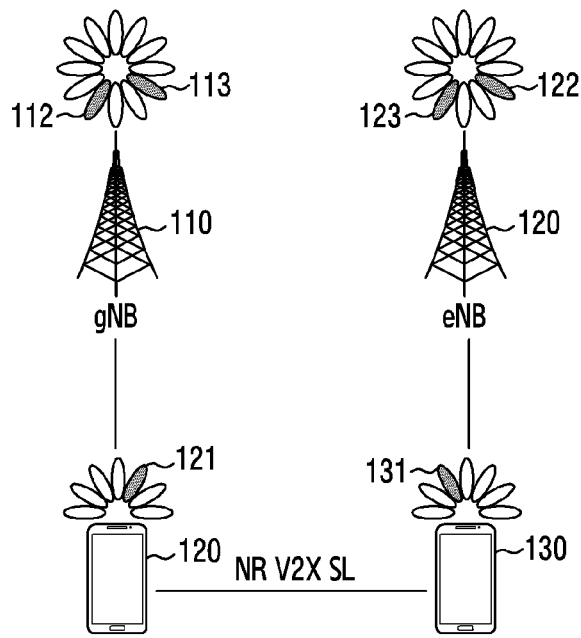
FIG. 5C illustrates a situation of the direct communication between the UEs using the sidelink RAT according to various embodiments.

FIG. 5C illustrates a scenario in which a UE 120 in gNB coverage and a UE 130 in eNB coverage perform the direct communication. Sidelink radio bearer configuration parameter information to be used for the V2X packet transmission and reception based the unicast, the broadcast, or the groupcast between the UEs may be transmitted through the system information message or the RRC dedicated message of the gNB or pre-configured. The UE which performs the direct communication may transmit QoS information corresponding to the V2X service to the gNB and acquire the sidelink radio bearer configuration parameter information from the base station. The UE which performs the direct communication may determine QoS information corresponding to the V2X service, arbitrarily configure some configuration parameter of the sidelink radio bearer and acquire some configuration parameter from the pre-configured information. In the unicast or groupcast direct communication, the UE in the gNB coverage may transmit the QoS information corresponding to the V2X service to the gNB, instead of the UE in the eNB coverage, and acquire the sidelink radio bearer configuration parameter information from the base station. The UEs of the direct communication, even in the base station coverage, may determine the QoS information corresponding to the V2X service from information arbitrarily selected by the UE or the pre-configured information and acquire the sidelink radio bearer configuration parameter.

Figure 5D:
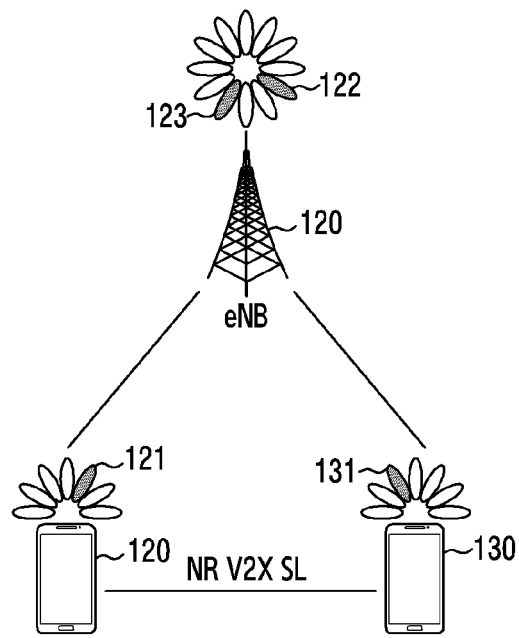
FIG. 5D illustrates a situation of the direct communication between the UEs using the sidelink RAT according to various embodiments.

FIG. 5D illustrates a scenario in which UEs in eNB coverage performs the direct communication. Sidelink radio bearer configuration parameter information to be used for the V2X packet transmission and reception based the unicast, the broadcast, or the groupcast between the UEs may be pre-configured. The UE which performs the direct communication may determine QoS information corresponding to the V2X service, arbitrarily set some configuration parameter of the sidelink radio bearer and acquire some configuration parameter from the pre-configured information.

The method for acquiring the sidelink QoS information and acquiring the sidelink radio bearer configuration parameter corresponding to the QoS in the direct communication between UEs may be used in the unicast V2X message transmission and reception, the broadcast V2X message transmission and reception, and the groupcast V2X message transmission and reception according to various embodiments of the disclosure. The sidelink radio bearer configuration parameter in the direct communication between UEs according to various embodiments of the disclosure may include at least one of a method for acquiring the parameter from the base station, a method for acquiring pre-configured information at the UE, and a method for arbitrarily configuring the parameter at the UE.

The QoS requirements of the V2X service according to various embodiments of the disclosure may be marked as a standardized 5QI value defined in 5GPP standard as shown in Table 1. The UE and the base station in the direct communication system between UEs may acquire the required QoS level of the V2X service based on the 5QI value.

TABLE 1

| 5QI value | Resource Type | Default Priority Level | Packet Delay Budget | Packet Error Rate | Default Maximum Data Burst Volume | Default Averaging Window | Example Services |
|---|---|---|---|---|---|---|---|
| 82 | Delay Critical GBR | 19 | 10 ms | $10^{-4}$ | 255 bytes | 2000 ms | Discrete Automation (see TS 22.261 [22]) |
| 83 | | 22 | 10 ms | $10^{-4}$ | 1354 bytes (NOTE 3) | 2000 ms | Discrete Automation (see TS 22.261 [22]), eV2X Messages (Platooning, Cooperative Lane Change with low LoA; see TS 22.186 [4]) |
| 84 | | 24 | 30 ms | $10^{-5}$ | 1354 bytes | 2000 ms | Intelligent transport systems (see TS 22.261 [22]) |
| 85 | | 21 | 5 ms | $10^{-5}$ | 255 bytes | 2000 ms | Electricity Distribution-high voltage (see TS 22.261 [22]), Remote Driving (see TS 22.186 [4]) |
| 100 | | 18 | 5 ms | $10^{-4}$ | 1354 bytes | 2000 ms | eV2X messages (Collision Avoidance, Platooning with high LoA (see TS 22.186 [4]) |

The QoS parameter of the V2X service may include at least one of parameters of Table 2 in addition to the standardized 5QI of Table 1.

TABLE 2

Payload (Bytes)
Transmission rate (Message/Sec)
Maximum end-to-end latency (ms)
Reliability (%)
Data rate (Mbps)
Minimum required communication range (meters)
Prioritized bit rate (PBR)
Bucket size duration (BSD)
PPPP (ProsePerPacketPriority)
PPPR (ProsePerPacketReliability)
LCH priority
Logical channel group associated (this parameter is needed for SL BSR in mode 1;
QoS parameter for each SL logical channel to differentiate each service from other service)

According to various embodiments of the disclosure, the QoS information corresponding to each V2X service may be the standardized 5QI of Table 1 or add at least one parameter defined in Table 2 to the standardized 5QI. The QoS parameters of Table 1 and Table 2 may be exchanged through Uu signaling between the base station and the UE or through sidelink signaling between the UEs.

In the disclosure, the QoS information corresponding to each V2X service is described as a V2X QoS index (VQI). The VQI in the disclosure may be set as follows.

TABLE 3

| 5QI | V2X QoS Index (VQI) |
|---|---|
| 83 | 83 |
| 84 | 84 |
| 85 | 85 |

TABLE 3-continued

| 5QI | V2X QoS Index (VQI) |
|---|---|
| 100 | 100 |
| ... | ... |

In the embodiment of Table 3, the VQI may be set identically to the 5QI value. The 5QI of Table 3 marks the parameters for the V2X with the standardized QoS index based on Table 1 and Table 2.

TABLE 4

| 5QI | V2X QoS Index (VQI) |
|---|---|
| 83 | 1 |
| 84 | 2 |
| 85 | 3 |

TABLE 4-continued

| 5QI | V2X QoS Index (VQI) |
|---|---|
| 100 | 4 |
| ... | ... |

In the embodiment of Table 4, the VQI may be set independently from the standardized 5QI value. The 5QI of Table 4 marks the parameters for the V2X with the standardized QoS index based on Table 1 and Table 2.

According to an embodiment of the disclosure, configuration information acquired by the UE for sidelink radio bearer (SLRB) configuration includes at least one of parameters of Table 5.

The parameters of Table 5 correspond to parameters configured by only a TX UE using the SLRB in the direct communication between UEs, parameters configured by a TX UE and a RX UE using the SLRB, and parameters configured by only a RX UE using the SLRB.

The parameters of Table 5 include a parameter for configuring the SLRB using the Uu signaling between the base station and the UE in the direct communication between UEs.

The parameters of Table 5 include a parameter for pre-configuring the SLRB in the UE in the direct communication between UEs.

The parameters of Table 5 include a parameter for configuring the SLRB using the sidelink signaling between the UEs in the direct communication between UEs.

The parameters of Table 5 include a parameter for configuring the SLRB using the Uu signaling between the base station and the UE to support a mode in which the base station directly schedules sidelink resources in the direct communication between UEs.

The parameters of Table 5 include a parameter for configuring the SLRB to support a mode in which the UE directly acquires sidelink resources in the direct communication between UEs.

The parameters of Table 5 include a configuration parameter for the SLRB which unicasts the direct communication between UEs.

The parameters of Table 5 include a configuration parameter for the SLRB which groupcasts the direct communication between UEs.

The parameters of Table 5 include a configuration parameter for the SLRB which broadcasts the direct communication between UEs.

TABLE 5

LCH priority (the priority and priority value of the logical channel may be set to the VQI value for each LCH)
Prioritized bit rate (PBR)
Bucket size duration (BSD)
Allowed Sidelink carriers (used for Sidelink PDCP duplication)
SR configuration associated (Mapping between SL logical channel and SL SR configuration; SR channel configuration information can be configured differently according to priority or QoS requirement of SL logical channel)
PHY related parameters (e.g. Sub carrier spacing, PUSCH duration, configured SL grant type 1 indicator; configured SL grant type 1 based resource allocation method etc.)
discardTimer (It is used in the mode in which the base station allocates SL resources and can operate different values according to QoS requirements. If not set by the base station, a default configuration for each VQI may be set)
Pdcp-SN-Size (It is possible to set a default configuration for each VQI or to configure which configuration the TX UE applies to the RX UE (Uu signaling of the base station or sidelink signaling between UEs))
maxCID
Profiles
t-Reordering (PDCP) (The default configuration for each VQI can be set or set to Uu signaling of the base station to the RX UE, or the TX UE can be set by forwarding to the RX UE obtained from the base station.)
RLC mode (RLC UM, RLC AM) (If the default configuration or multiple options, set the default configuration according to the unicast/groupcast/broadcast setting, or what configuration the TX UE will apply to the RX UE (Uu signaling of the base station to the sidelink between UEs) Signaling) can be set.
Logical channel identity (TX UE can set arbitrarily)
Logical channel group for sidelink data (TX UE can deliver the logical channel ID and logical channel group information about it to the base station)
Logical channel group for sidelink RRC (TX UE can deliver the logical channel ID and logical channel group information about it to the base station)
t-Reassembly (RLC) (The default configuration for each VQI can be set or set to Uu signaling of the base station to the RX UE, or the TX UE can be set by forwarding to the RX UE obtained from the base station.)
sn-FieldLength (RLC) (Set a default configuration for each VQI or set to Uu signaling of the base station to the RX UE, or can be set by forwarding the TX UE obtained from the base station to the RX UE.)
t-Reordering (RLC) (The default configuration for each VQI can be set or set to Uu signaling of the base station to the RX UE, or the TX UE can be set by forwarding to the RX UE obtained from the base station.)

According to an embodiment, mapping between the VQI of Table 3 and Table 4 and the SLRB configuration parameters of Table 5 is shown in Table 6, Table 7, and Table 8.

TABLE 6

| V2X QoS index | SLRB configuration parameters |
|---|---|
| 83 to 1 | At least one parameter included in Table 5 and a value thereof, for example, LCH priority = 3, Pdcp-SN-Size = 16, t-reorderingtimer(PDCP) = 100 ms, ... |

TABLE 6-continued

| V2X QoS index | SLRB configuration parameters |
|---|---|
| 84 to 2 | At least one parameter included in Table 5 and a value thereof, for example, LCH priority = 1, Pdcp-SN-Size = 16, t-reorderingtimer(PDCP) = 120 ms, . . . |
| 85 to 3 | At least one parameter included in Table 5 and a value thereof, for example, LCH priority = 4, Pdcp-SN-Size = 16, t-reorderingtimer(PDCP) = 100 ms, . . . |
| 100 to 4 | At least one parameter included in Table 5 and a value thereof, for example, LCH priority = 2, Pdcp-SN-Size = 32, t-reorderingtimer(PDCP) = 50 ms , . . . |
| . . . | |

Table 6 shows the SLRB configuration parameter values corresponding to the vQI index. The SLRB configuration parameter values of Table 6 are exemplary and may include at least one of the parameters of Table 5.

TABLE 7

| SLRB configuration index | SLRB configuration parameters |
|---|---|
| 1 | At least one parameter included in Table 5 and a value thereof, for example, LCH priority = 3, Pdcp-SN-Size = 16, t-reorderingtimer(PDCP) = 100 ms, . . . |
| 2 | At least one parameter included in Table 5 and a value thereof, for example, LCH priority = 1, Pdcp-SN-Size = 16, t-reorderingtimer(PDCP) = 120 ms, . . . |
| 3 | At least one parameter included in Table 5 and a value thereof, for example, LCH priority = 4, Pdcp-SN-Size =16, t-reorderingtimer(PDCP) = 100 ms, . . . |
| 4 | At least one parameter included in Table 5 and a value thereof, for example, LCH priority = 2, Pdcp-SN-Size = 32, t-reorderingtimer(PDCP) = 50 ms, . . . |
| . . . | |

Table 7 shows that the SLRB configuration including at least one of the SLRB configuration parameters of Table 5 with the index. The information of Table 7 may be preconfigured at the UE or received over the air (OTA) or via the base station. The information of Table 7 may be managed by the base station or a V2X server.

TABLE 8

| V2X QoS index | SLRB configuration index |
|---|---|
| 83 to 1 | 1 |
| 84 to 2 | 2 |
| 85 to 3 | 3 |
| 100 to 4 | 4 |
| . . . | |

Table 8 is the embodiment in which the SLRB configuration parameters corresponding to the VQI index is marked with the index of Table 7.

According to an embodiment of the disclosure, the QoS parameter for the V2X service not marked with the standardized QoS index for the QoS information of Table 1 through Table 4 may be acquired through the Uu signaling between the base station and the UE or through the sidelink signaling between the UEs.

Now, a method for setting the SLRB configuration based on the QoS information in the direct communication between UEs is explained by referring to FIG. 6 through FIG. 9. The disclosure suggests two methods for the SLRB configuration based on the QoS information as follows.

Configuration Method 1: Configured by the Base Station

This method may be used if the UE is operated in RRC_Connected, RRC_Idle, or RRC_Inactive. The base station may set SLRB configuration information corresponding to the QoS information of the V2X service using RRC dedicated signaling (e.g., RRC connection reconfiguration) or a V2X SIB message to the terminal. This method is applicable if the direct communication between UEs is unicast, groupcast, or broadcast.

Configuration Method 2: Configured by the UE

This method may be used if the UE is operated in RRC_Connected, RRC_Inactive, or out of coverage. Default SLRB configuration corresponding to the QoS information of the V2X service may be set. Alternatively, the UE may arbitrarily set the SLRB configuration to correspond to the QoS information of the V2X service. Some SLRB configuration parameters require synchronization between the TX UE and the RX UE, and such parameters may be set to use default configuration. According to another embodiment, the SLRB configuration parameter requiring the synchronization between the TX UE and the RX UE may be set through signaling between the TX UE and the RX UE. This method is applicable if the direct communication between UEs is unicast, groupcast, or broadcast.

The second method may be also used in a system without the base station. However, as the advanced V2X use case is adopted and guaranteed SL resource allocation or guaranteed SL configuration is received from the base station with respect to a service which should guarantee a better communication service quality, it may be advantageous to use the first method.

The disclosure provides an SLRB configuration method corresponding to the QoS information according to the direct communication between UEs as follows.

(1) Unicast

If the base station sets the SLRB configuration, the base station may transmit the SLRB configuration to the TX UE.

According to an embodiment, the base station may transmit the SLRB configuration requiring the synchronization with the RX UE, to the RX UE through the Uu signaling. In so doing, the RX UE may transmit an SLRB configuration request (including at least one of unicast ID or QoS information/VQI) to the base station and receive the SLRB configuration from the base station. According to another embodiment, without a request of the RX UE, the base station may transmit the SLRB configuration for the RX UE.

According to yet another embodiment, the base station may transmit the SLRB configuration requiring the synchronization with the RX UE, to the RX UE via the TX UE. In so doing, the base station may indicate which parameter should be forwarded to the RX UE, to the TX UE. SLRB configuration signaling from the TX UE to the RX UE is a sidelink RRC message or a sidelink SIB message.

If the terminal sets the SLRB configuration, the TX UE may transmit the parameter requiring the synchronization to the RX UE according to an embodiment. The SLRB configuration signaling from the TX UE to the RX UE is a sidelink RRC message or a sidelink SIB message. According to another embodiment, the parameter requiring the synchronization between the TX UE and the RX UE may be set as the default configuration.

(2) Broadcast

If the base station sets the SLRB configuration, the base station may transmit the SLRB configuration to the TX UE.

As for the SLRB configuration requiring the synchronization with the RX UE, the base station may transmit V2X SBI and thus notify the SLRB configuration corresponding to the VQI to be synchronized with the RX UE according to an embodiment. According to another embodiment, the TX UE may transmit a sidelink SIB message and thus notify the SLRB configuration corresponding to the VQI to be synchronized with the RX UE.

If the UE sets the SLRB configuration, the TX UE and the RX UE may use the default SLRB configuration corresponding to the VQI according to an embodiment. According to another embodiment, the TX UE may transmit a sidelink SIB message and thus notify the SLRB configuration corresponding to the VQI to be synchronized with the RX UE. A parameter not to be synchronized with the RX UE may be arbitrarily set and used by the TX UE.

(3) Groupcast

At least one of (1) the unicast method or (2) the broadcast method may be used. Signaling the SLRB configuration from a group leader UE to a group member UE is a sidelink RRC message or a sidelink SIB message.

FIGS. 6A through 6D illustrate signal flows of SLRB configuration for direct communication between UEs which are in RRC_CONNECTED according to various embodiments of the disclosure. In the embodiment of FIGS. 6A through 6D, a UE1 may be assumed to be a TX UE, and a UE2 may be assumed to be a RX UE. The embodiment of FIGS. 6A through 6D may be applied if a source terminal and a destination terminal are fixed in the unicast direct communication. The embodiment of FIGS. 6A through 6D may be applied if a source terminal and a destination terminal of a group are fixed in the groupcast direct communication.

Figure 6A:
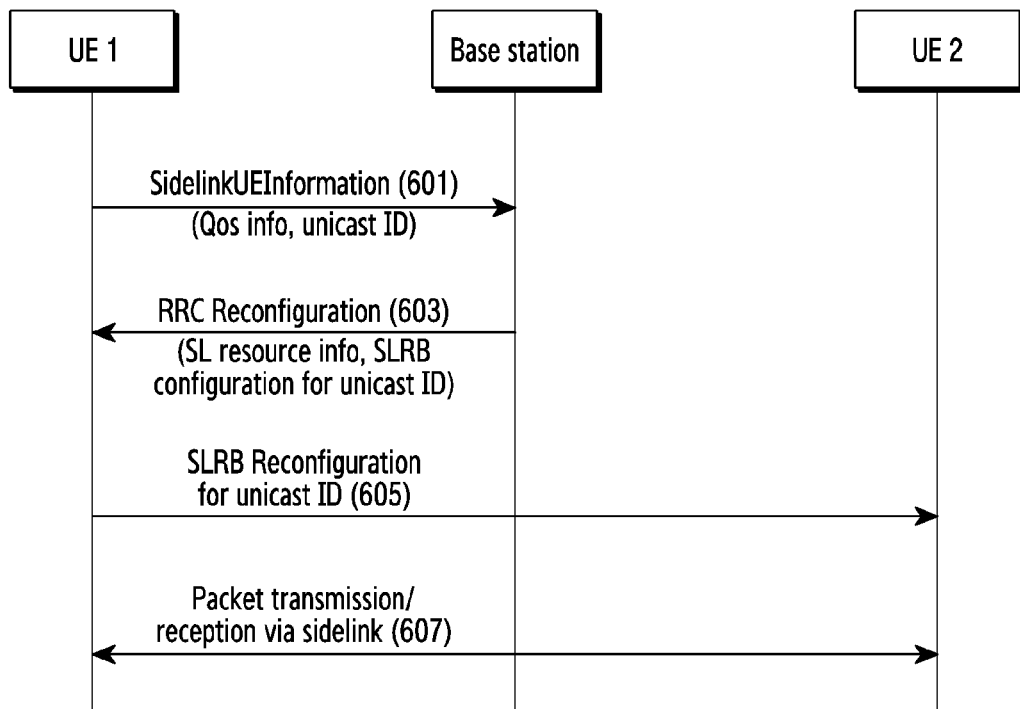
FIG. 6A illustrates signal flows of sidelink radio bearer (SLRB) configuration for direct communication between UEs which are RRC_CONNECTED according to various embodiments of the disclosure.

Referring to FIG. 6A, the UE1 and the UE2 may set a unicast session for the direct communication between UEs. If setting the unicast session, the UE1 and the UE2 may exchange a unicast ID and QoS information of the corresponding unicast session. The QoS information may include VQI according to an embodiment of the disclosure. The UE1 may transmit the VQI information of Table 1 through Table 4 to a base station and request to set SLRB configuration via the base station in operation 601. The UE1 may transmit the VQI or the unicast ID to the base station. The base station may configure and transmit the SLRB configuration information of Table 5 through Table 8 to the UE1 for the sidelink unicast requested by the UE1 in operation 603. In operation 603, the base station may transmit sidelink resource allocation information (first mode setting or second mode setting) besides the SLRB configuration information used in the sidelink unicast. In operation 605, the UE1 may transmit the QoS information and the SLRB configuration information to use in the unicast corresponding to the unicast ID, to the UE1 corresponding to the destination terminal. In operation 607, the UE1 and the UE2 may perform V2X packet transmission and reception by applying SLRB configuration parameters to the unicast corresponding to the unicast ID.

Figure 6B:
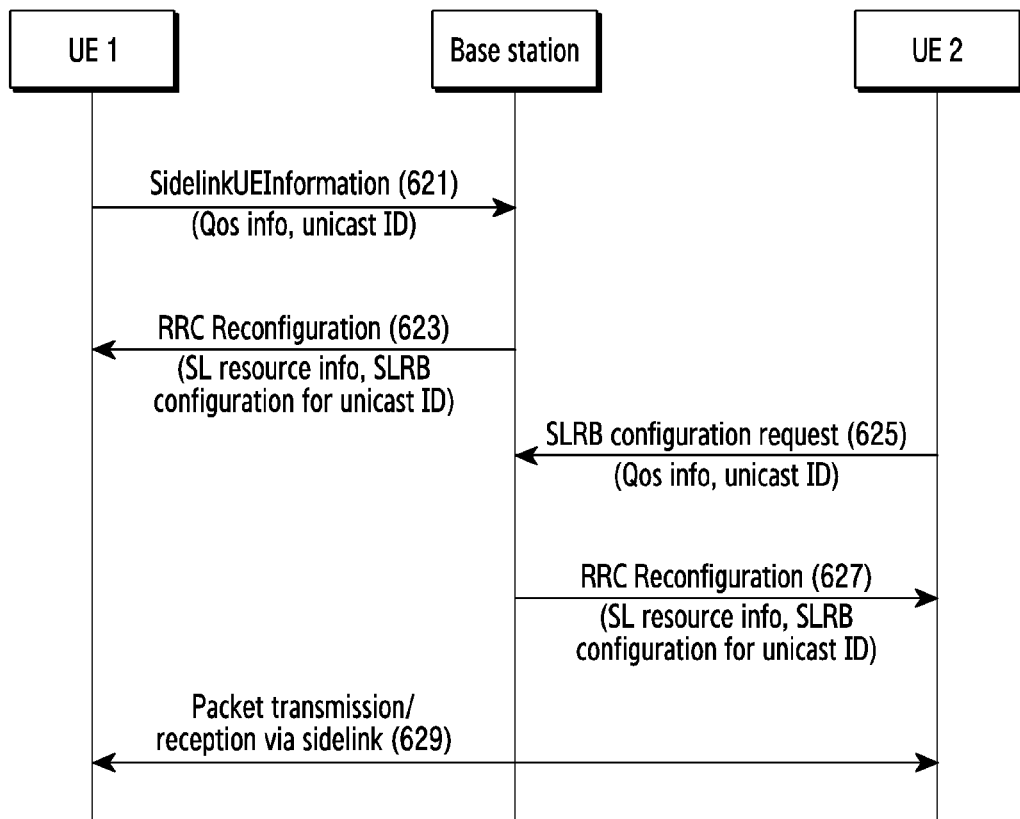
FIG. 6B illustrates signal flows of the SLRB configuration for the direct communication between the UEs which are RRC_CONNECTED according to various embodiments of the disclosure.

Referring to FIG. 6B, the UE1 and the UE2 may set a unicast session for the direct communication between UEs. If setting the unicast session, the UE1 and the UE2 may exchange a unicast ID and QoS information of the corresponding unicast session. The QoS information may include VQI according to an embodiment of the disclosure. The UE1 may transmit the VQI information of Table 1 through Table 4 to the base station and requests to set SLRB configuration via the base station in operation 621. The UE1 may transmit the VQI or the unicast ID to the base station. The UE1 may transmit information indicating the source terminal to the base station. The base station may configure and transmit the SLRB configuration information of Table 5 through Table 8 to the UE1 for the sidelink unicast requested by the UE1 in operation 623. In operation 623, the base station may transmit sidelink resource allocation information (first mode setting or second mode setting) besides the SLRB configuration information used in the sidelink unicast. The UE2 corresponding to the destination terminal may transmit the VQI information of Table 1 through Table 4 and request to set the SLRB configuration via the base station in operation 625. The UE2 may transmit the VQI or the unicast ID to the base station. The UE2 may transmit information indicating the destination terminal to the base station. In operation 627, the base station may configure and transmit to the UE2 the SLRB configuration information of Table 5 through Table 8 for the sidelink unicast requested by the UE2. In operation 629, the UE1 and the UE2 may perform V2X packet transmission and reception by applying SLRB configuration parameters to the unicast corresponding to the unicast ID.

Figure 6C:
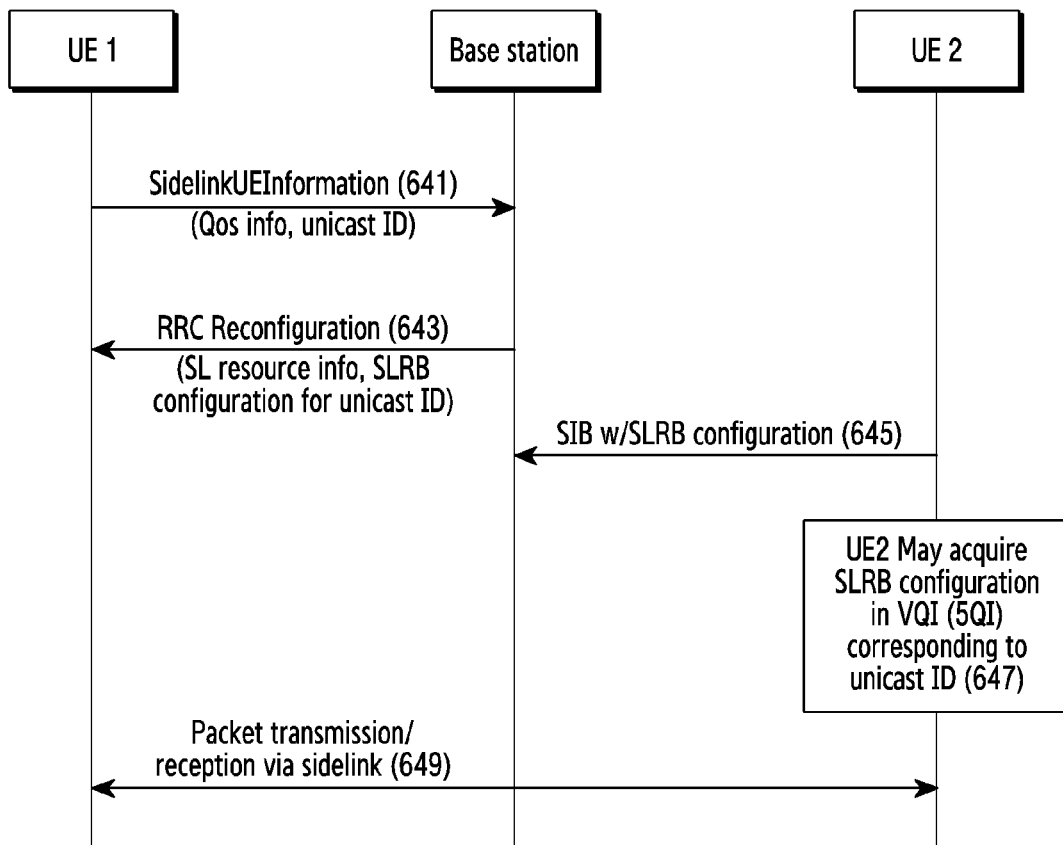
FIG. 6C illustrates signal flows of the SLRB configuration for the direct communication between the UEs which are RRC_CONNECTED according to various embodiments of the disclosure.

Referring to FIG. 6C, the UE1 and the UE2 may set a unicast session for the direct communication between UEs. If setting the unicast session, the UE1 and the UE2 may exchange a unicast ID and QoS information of the corresponding unicast session. The QoS information may include the VQI according to an embodiment of the disclosure. The UE1 may transmit the VQI information of Table 1 through Table 4 to the base station and requests to set SLRB configuration via the base station in operation 641. The UE1 may transmit the VQI or the unicast ID to the base station. The UE1 may transmit information indicating the source terminal to the base station. The base station may configure and transmit to the UE1 the SLRB configuration information of Table 5 through Table 8 for the sidelink unicast requested by the UE1 in operation 643. In operation 643, the base station may transmit sidelink resource allocation information (first mode setting or second mode setting) besides the SLRB configuration information used in the sidelink unicast. In operation 645, the base station may transmit the SLRB configuration information to use in the sidelink unicast through a V2X SIB message. Information included in the V2X SIB message is the SLRB configuration information mapped to the VQI. The V2X SIB message of operation 645 is transmitted by the base station on a periodic basis or on an event basis, or on demand at a request of the UE separately from operation 641 and operation 643. The UE2 corresponding to the destination terminal may acquire the SLRB configuration through the V2X SIB message transmitted from the base station in operation 647. In so doing, the UE2 has the VQI information or the unicast ID to apply to the unicast, and may acquire the SLRB configuration information corresponding to the VQI from the V2X SIB message. In operation 649, the UE1 and the UE2 may perform V2X packet transmission and reception by applying SLRB configuration parameters to the unicast corresponding to the unicast ID.

Figure 6D:
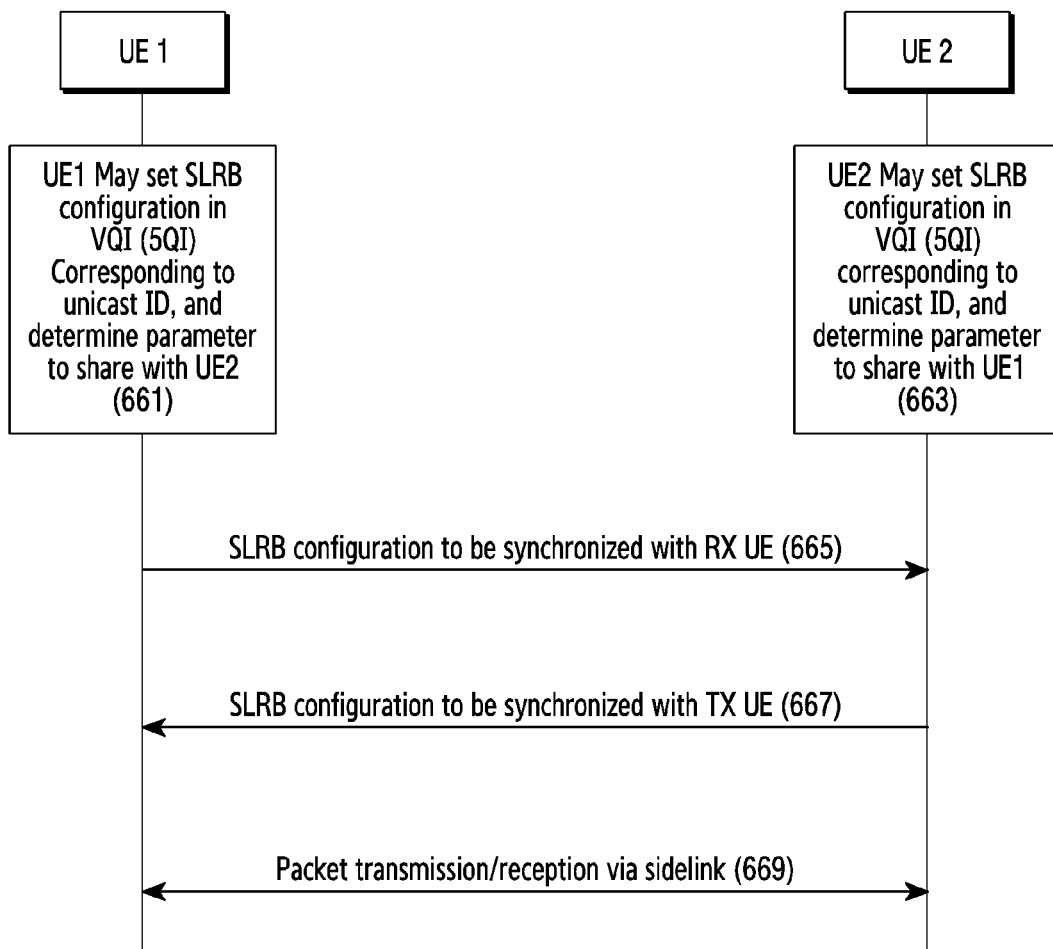
FIG. 6D illustrates signal flows of the SLRB configuration for the direct communication between the UEs which are RRC_CONNECTED according to various embodiments of the disclosure.

Referring to FIG. 6D, the UE1 and the UE2 may set a unicast session for the direct communication between UEs. If setting the unicast session, the UE1 and the UE2 may exchange a unicast ID and QoS information of the corresponding unicast session. The QoS information may include the VQI according to an embodiment of the disclosure. In operation 661, the UE1 may set SLRB configuration corresponding to the QoS information of the unicast session. In operation 661, the UE1 may determine SLRB configuration information which the destination terminal UE2 of the unicast session should know besides the configuration parameters which may be arbitrary selected and applied by the UE1. In operation 665, the UE1 may transmit the SLRB configuration information for the UE2. For example, if determining the RLC mode of the configuration parameters of Table 5 through Table 8 to RLC AM, the RLC mode may be informed to the UE2. In operation 663, the UE2 may set SLRB configuration corresponding to the QoS information of the unicast session. In operation 663, the UE2 may determine the SLRB configuration information which the source terminal UE1 of the unicast session should know besides the configuration parameters which may be arbitrary selected and applied by the UE2. In operation 667, the UE2 may transmit the SLRB configuration information for the UE1. For example, the UE2 may determine PDCP t-Reordering value from the configuration parameters of Table 5 through Table 8 and notify the PDCP t-Reordering value to the UE1. In operation 669, the UE1 and the UE2 may perform V2X packet transmission and reception by applying the SLRB configuration parameters to the unicast corresponding to the unicast ID.

It is noted that the embodiment of FIG. 6D is applied to the UE1 and the UE2 which are RRC_IDLE, RRC_INACTIVE, or out of coverage.

Figure 7:
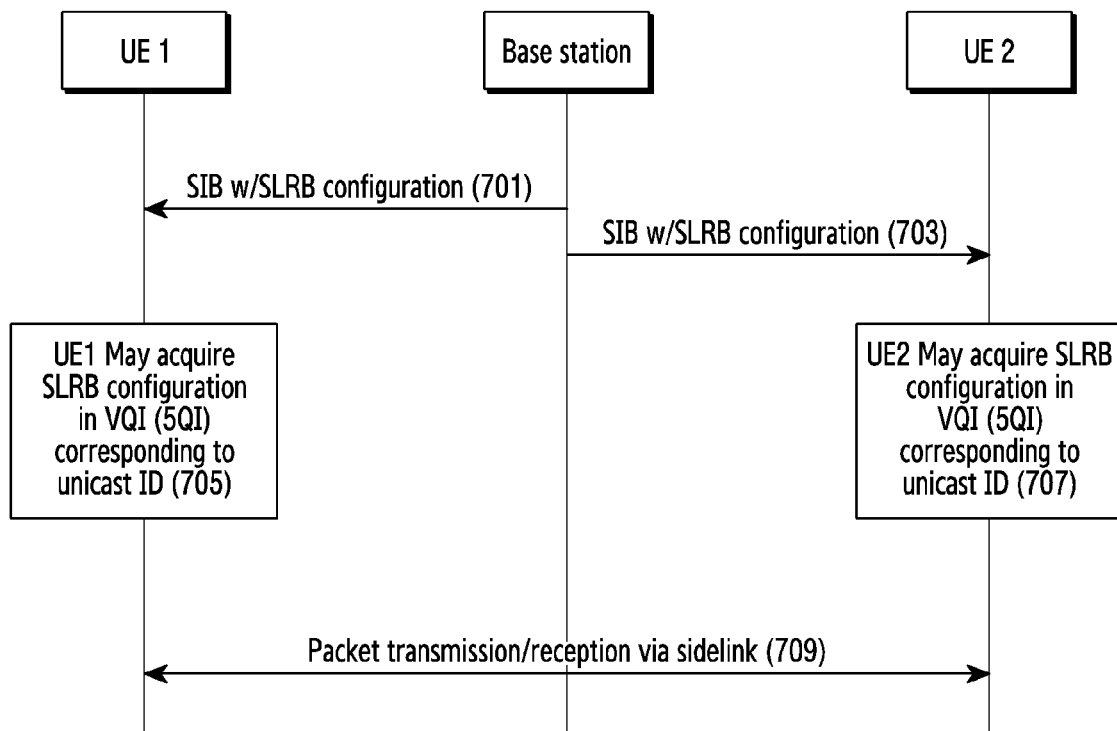
FIG. 7 illustrates signal flows of SLRB configuration for direct communication between UEs which are RRC_IDLE according to various embodiments of the disclosure.

FIG. 7 illustrates signal flows of SLRB configuration for direct communication between UEs which are RRC_IDLE according to various embodiments of the disclosure.

The embodiment of FIG. 7 may be applied to the UE1 which is RRC_INACTIVE. In the embodiment of FIG. 7, it may be assumed that the UE1 is the TX UE and the UE2 is the RX UE.

The embodiment of FIG. 7 may be applied to a case in which the source terminal and the destination terminal are fixed in the unicast direct communication. The embodiment of FIG. 7 may be applied to a case in which the source terminal and the destination terminal of a group are fixed in the groupcast direct communication.

Referring to FIG. 7, the UE1 and the UE2 may set a unicast session for the direct communication between UEs. If setting the unicast session, the UE1 and the UE2 may exchange a unicast ID and QoS information of the corresponding unicast session. The QoS information may include the VQI according to an embodiment of the disclosure and corresponds to Table 1 through Table 4. The base station may transmit SLRB configuration information corresponding to the VQI to the UE1 and the UE2 using V2X SIB messages in operation 701 and operation 703. The SLRB configuration information corresponds to Table 5 through Table 8. In operations 705 and 707, the UE1 and the UE2 may determine VQI corresponding to the unicast ID and acquire the SLRB configuration information corresponding to the VQI.

In operation 709, the UE1 and the UE2 may perform V2X packet transmission and reception by applying SLRB configuration parameters to the unicast corresponding to the unicast ID.

Figure 8:
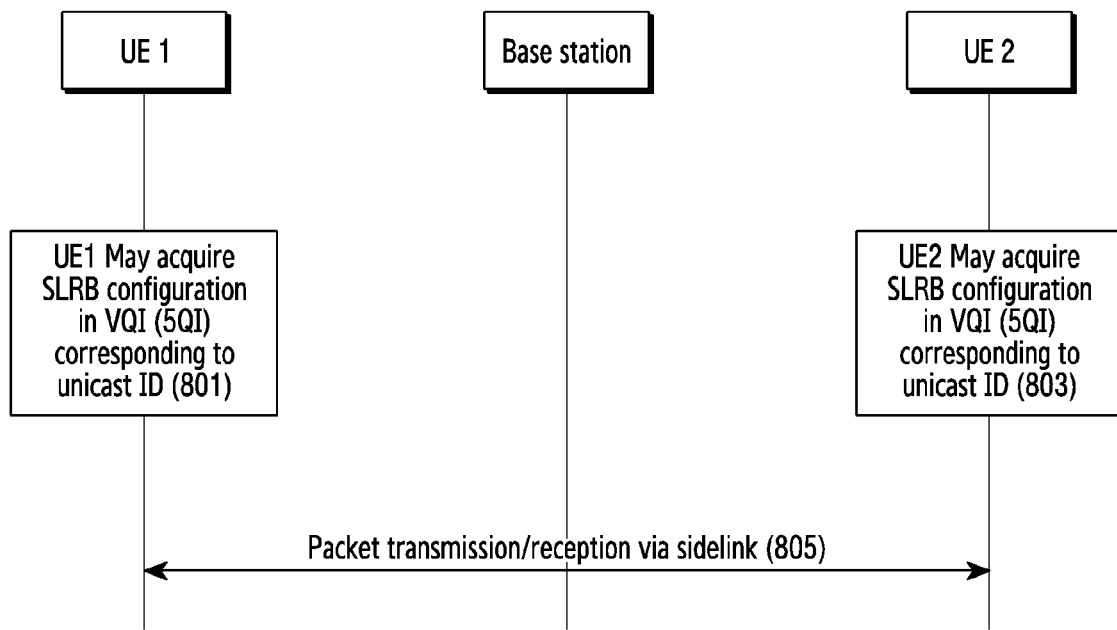
FIG. 8 illustrates signal flows of SLRB configuration for direct communication between UEs which are out of coverage according to various embodiments of the disclosure.

FIG. 8 illustrates signal flows of SLRB configuration for direct communication between UEs which are out of coverage according to various embodiments of the disclosure. In the embodiment of FIG. 8, it may be assumed that the UE1 is the TX UE and the UE2 is the RX UE.

The embodiment of FIG. 8 may be applied to a case in which the source terminal and the destination terminal are fixed in the unicast direct communication. The embodiment of FIG. 8 may be applied to a case in which the source terminal and the destination terminal of a group are fixed in the groupcast direct communication.

Referring to FIG. 8, the UE1 and the UE2 may set a unicast session for the direct communication between UEs. If setting the unicast session, the UE1 and the UE2 may exchange a unicast ID and QoS information of the corresponding unicast session. The QoS information may include the VQI according to an embodiment of the disclosure. In operations 801 and 803, the UE1 and the UE2 may determine VQI corresponding to the unicast ID and acquire the SLRB configuration information corresponding to the VQI. In the embodiment of FIG. 8, the UE1 and the UE2 may acquire the SLRB configuration information corresponding to the VQI from pre-configured configuration.

In operation 805, the UE1 and the UE2 may perform V2X packet transmission and reception by applying SLRB configuration parameters to the unicast corresponding to the unicast ID.

FIGS. 9A through 9D illustrate signal flows of SLRB configuration for direct communication between UEs according to various embodiments of the disclosure.

The embodiment of FIGS. 9A through 9D may be applied to a UE which performs broadcast direct communication. The embodiment of FIGS. 9A through 9D may be applied to a UE which performs groupcast direct communication.

Figure 9A:
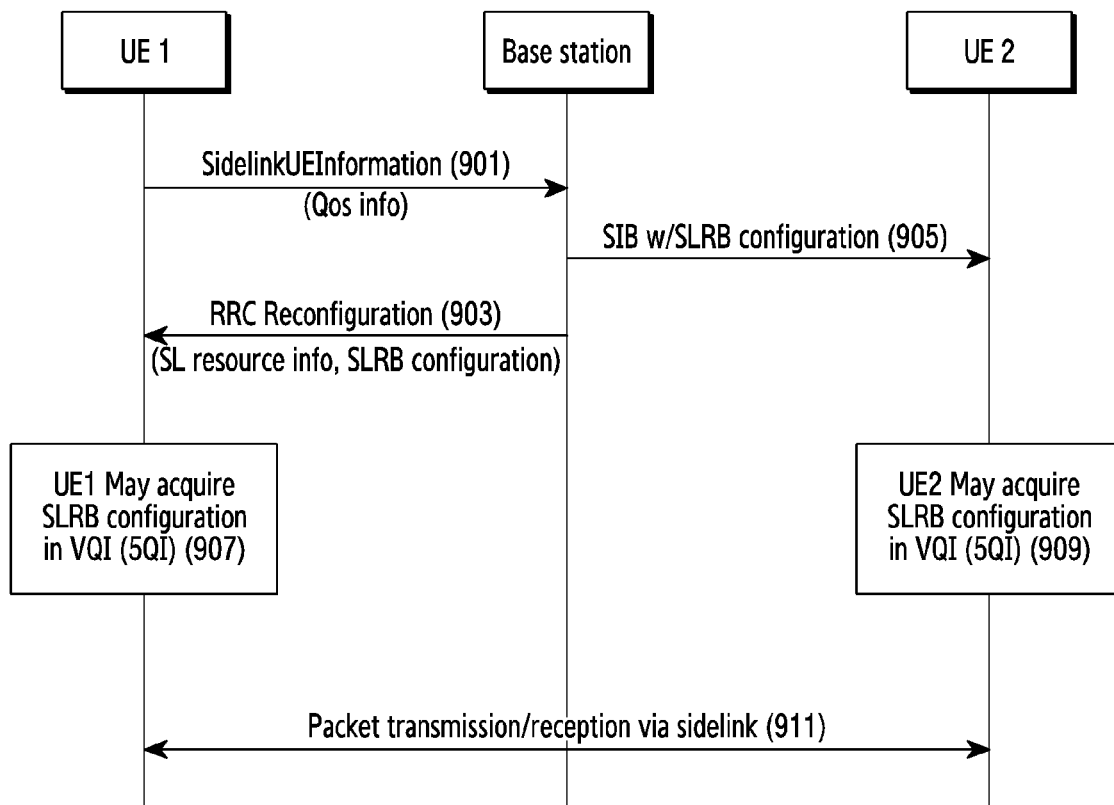
FIG. 9A illustrates signal flows of SLRB configuration for direct communication between UEs according to various embodiments of the disclosure.

Referring to FIG. 9A, the UE1 may transmit a SidelinkUEInformation message including QoS information to the base station. The QoS information may include the VQI according to an embodiment of the disclosure and corresponds to Table 1 through Table 4. The base station may transmit a RRC Connection Reconfiguration message including SLRB configuration corresponding to the QoS information to the UE1 in operation 903. In operation 907, the UE1 may acquire the SLRB configuration corresponding to the QoS information from the RRC Connection Reconfiguration message received from the base station. In operation 905, the base station may transmit the SLRB configuration corresponding to the QoS information using a V2X SIB message. In operation 909, the UE2 may receive the V2X SIB message from the base station and acquire the SLRB configuration information corresponding to the QoS information. The SLRB configuration information transmitted by the base station in operations 903 and 905 corresponds to Table 5 through Table 8. In operation 911, the UE1 and the UE2 may perform V2X packet transmission and reception by applying SLRB configuration parameters corresponding to the QoS information.

Figure 9B:
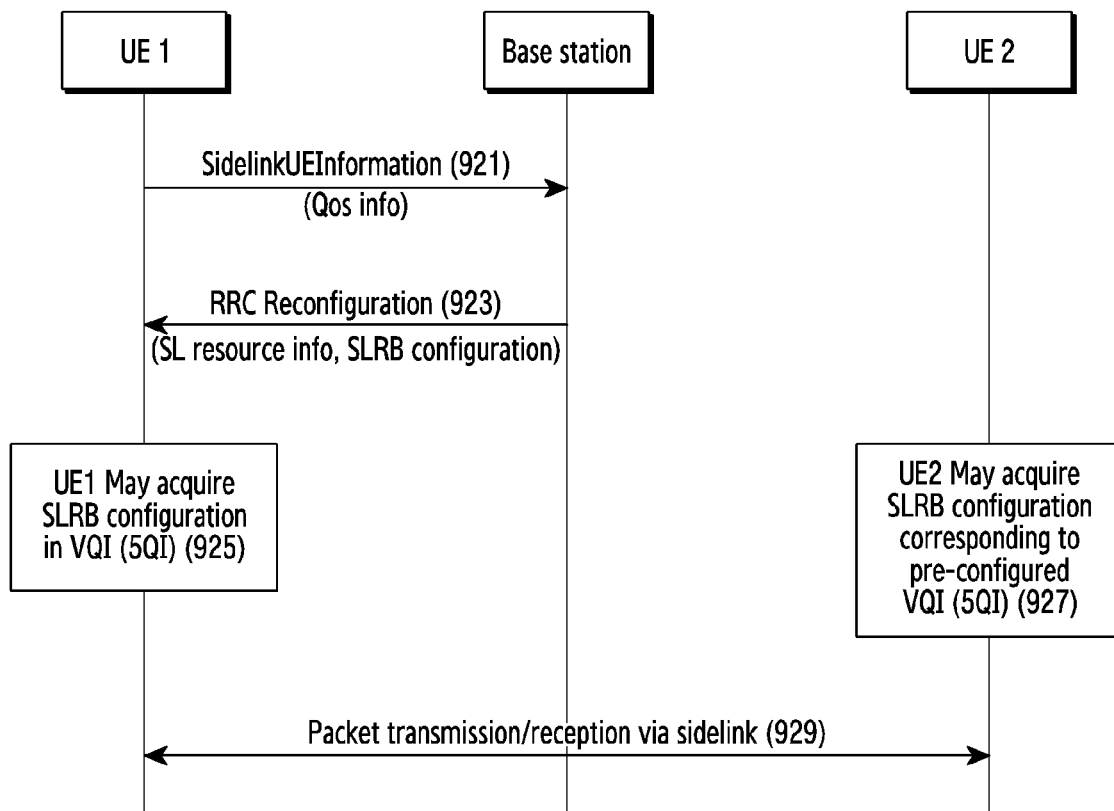
FIG. 9B illustrates signal flows of the SLRB configuration for the direct communication between the UEs according to various embodiments of the disclosure.

Referring to FIG. 9B, the UE1 may transmit a SidelinkUEInformation message including QoS information to the base station in operation 921. The QoS information may include the VQI according to an embodiment of the disclosure and corresponds to Table 1 through Table 4. The base station may transmit a RRC Connection Reconfiguration message including SLRB configuration corresponding to the QoS information to the UE1 in operation 923. In operation 925, the UE1 may acquire the SLRB configuration corresponding to the QoS information received from the base station. In operation 927, the UE2 may acquire SLRB configuration according to pre-configured QoS information. The SLRB configuration in operations 923 through 927 corresponds to Table 5 through Table 8. In operation 929, the UE1 and the UE2 may perform V2X packet transmission and reception by applying SLRB configuration parameters corresponding to the QoS information.

Figure 9C:
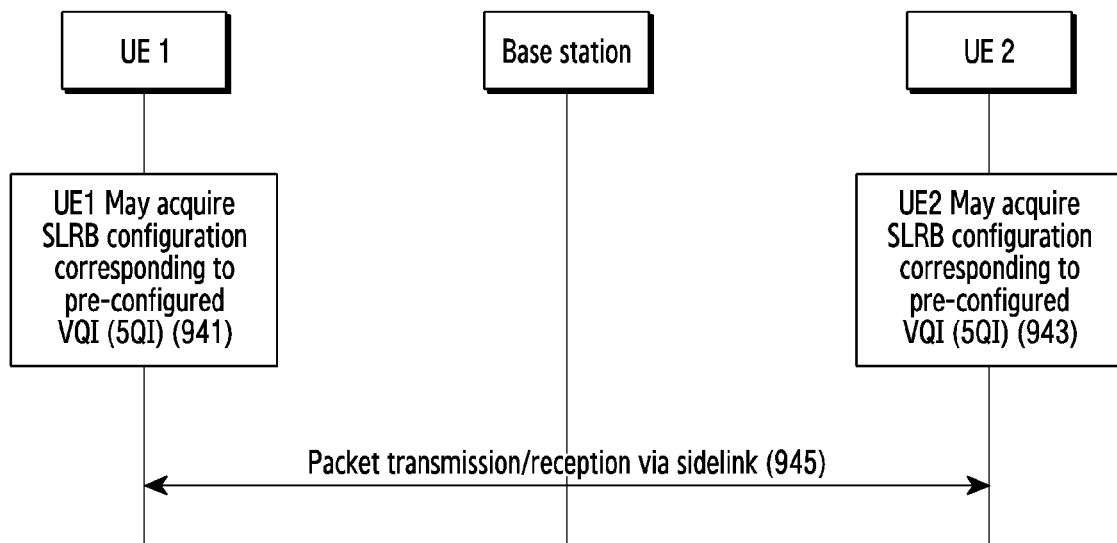
FIG. 9C illustrates signal flows of the SLRB configuration for the direct communication between the UEs according to various embodiments of the disclosure.

Referring to FIG. 9C, the UE1 and the UE2 may acquire SLRB configuration corresponding to pre-configured QoS information in operation 941 and operation 943. The SLRB configuration corresponds to Table 5 through Table 8. The QoS information may include the VQI according to an embodiment of the disclosure. In operation 945, the UE1 and the UE2 may perform V2X packet transmission and reception by applying SLRB configuration parameters corresponding to the QoS information.

Figure 9D:
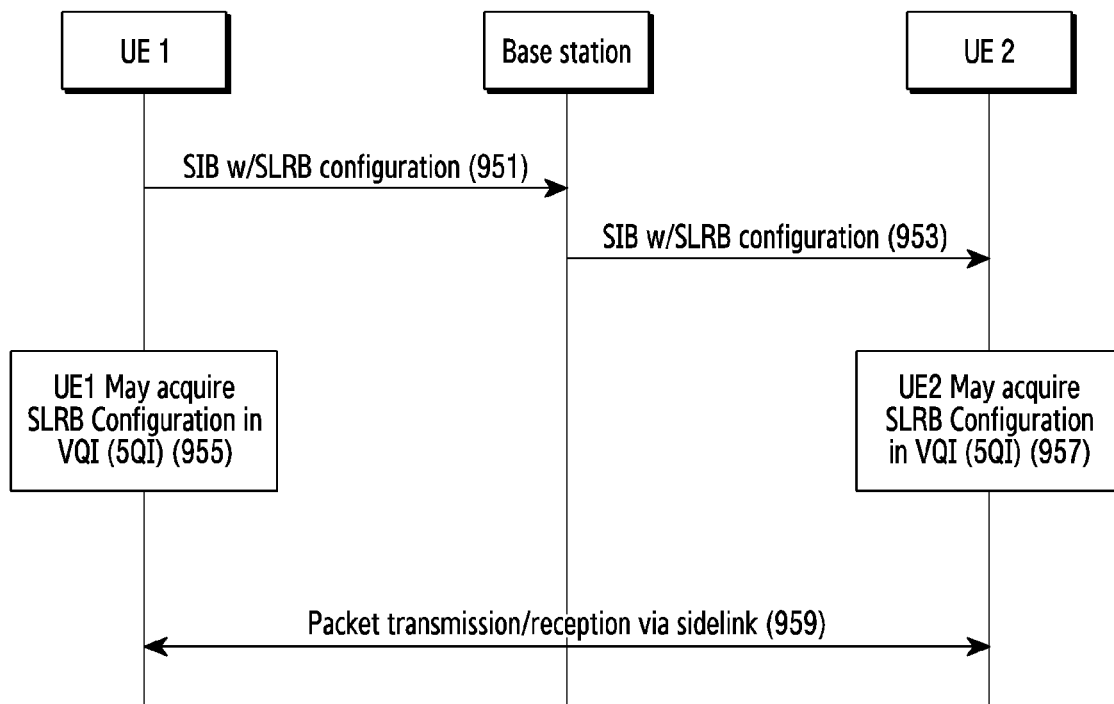
FIG. 9D illustrates signal flows of the SLRB configuration for the direct communication between the UEs according to various embodiments of the disclosure.

Referring to FIG. 9D, the base station may transmit SLRB configuration information corresponding to QoS information through V2X SIB messages in operations 951 and 953. The QoS information may include the VQI according to an embodiment of the disclosure and corresponds to Table 1 through Table 4. The SLRB configuration information transmitted by the base station in operations 951 and 953 corresponds to Table 5 through Table 8. The UE1 and the UE2 may receive the V2X SIB message from the base station and acquire the SLRB configuration corresponding to the QoS information in operation 955 and operation 957. In operation 959, the UE1 and the UE2 may perform V2X packet transmission and reception by applying SLRB configuration parameters corresponding to the QoS information.

Figure 10A:
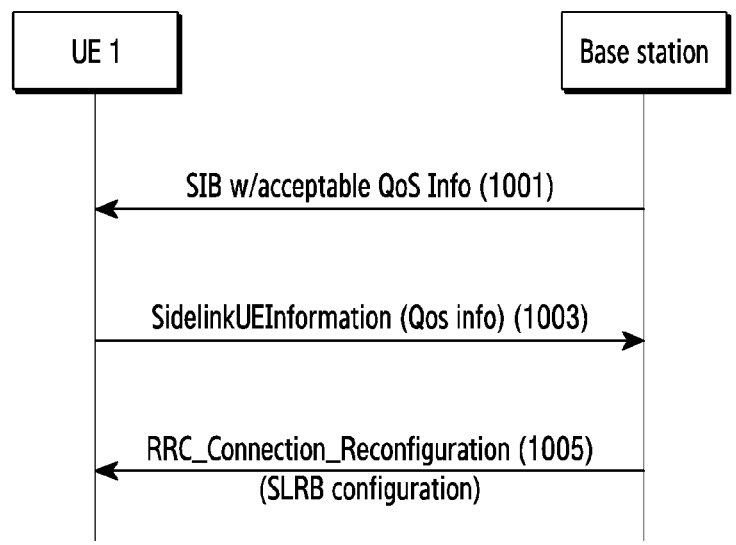
FIG. 10A illustrates signal flows of admission control for direct communication between UEs according to various embodiments of the disclosure.
Figure 10B:
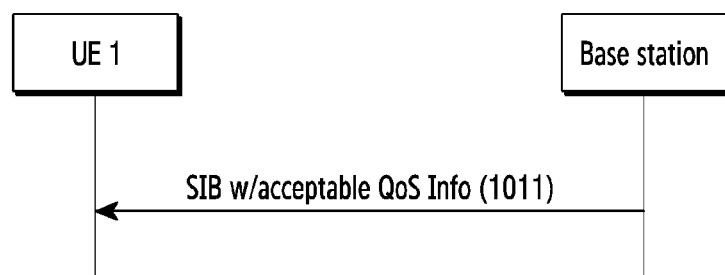
FIG. 10B illustrates signal flows of the admission control for the direct communication between the UEs according to various embodiments of the disclosure.
Figure 10C:
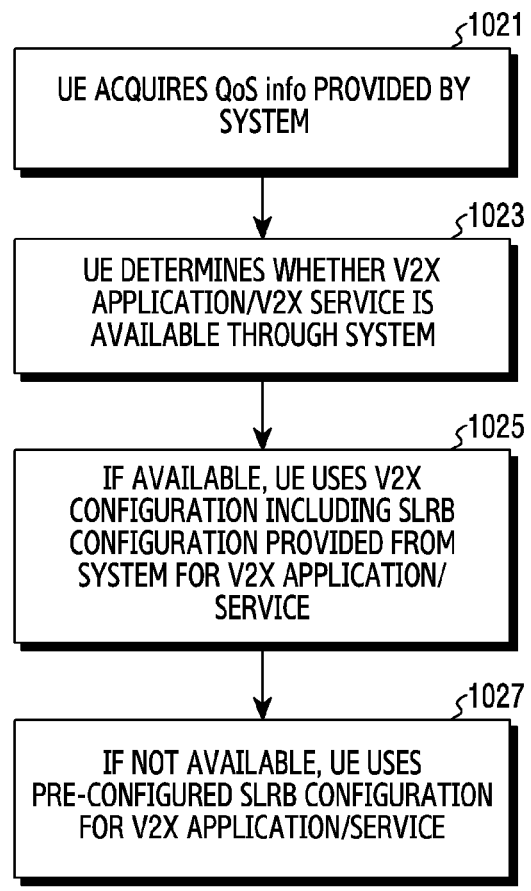
FIG. 10C illustrates signal flows of the admission control for the direct communication between the UEs according to various embodiments of the disclosure.

FIGS. 10A, 10B, and 10C illustrate signal flows of admission control for direct communication between UEs according to various embodiments of the disclosure.

A V2X system may provide the UE with V2X service information available in a corresponding system or information of whether a corresponding system may provide a particular V2X service. The corresponding system may not provide the V2X service because a protocol version supported by the V2X system and a protocol version supported by the UE are different, and the corresponding system may not provide the V2X service because sidelink radio resources or Uu link radio resources lack. The embodiment of the disclosure provides a method for notifying the UE of information indicating whether required SLRB configuration is provided to satisfy QoS information required by the V2X service of the UE. The UE may operate in RRC_CONNECTED, RRC_IDLE, or RRC_INACTIVE. If receiving the SLRB configuration for satisfying the QoS information required by the corresponding V2X service, the UE may receive the V2X service via the corresponding system. If not receiving the SLRB configuration for satisfying the QoS information required by the corresponding V2X service, the UE may not receive the V2X service via the corresponding system. Herein, the system may include a base station. In the latter case, the UE out of coverage may receive the corresponding V2X service by using pre-configured SLRB configuration or by directly setting the SLRB configuration.

The indication information for the system to notify the UE that the SLRB configuration for satisfying the QoS information required by the particular V2X service is available may be transmitted in a V2X SIB message according to an embodiment of the disclosure. The SLRB configuration availability indication information may be marked as follows.

Service availability indication (SLRB configuration indication, SLRB admission control indication)

(1) QoS information list (VQI list) supporting SLRB configuration in system (2) QoS information list (VQI list) not supporting SLRB configuration in system (3) VQI threshold supporting SLRB configuration in system (supporting this VQI value or more or supporting this VQI value or less)

(4) VQI threshold not supporting SLRB configuration in system (not supporting this VQI value or more or not supporting this VQI value or less)

(3) and (4) may be utilized if the VQI is defined in sequence from 1, that is, the QoS level is increased or decreased.

The embodiment of FIG. 10 provides a method for managing the SLRB configuration according to the admission control Referring to FIG. 10A, the UE1 may receive a V2X SIB message including service availability indication from the base station in operation 1001. If the UE determines that the QoS information of the V2X service to be provided via the base station is supported according to the service availability indication of operation 1001, the UE1 may transmit a SidelinkUEInformation to the base station in operation 1003. The QoS information may include at least VQI and corresponds to Table 1 through Table 4. The UE1 may receive SLRB configuration corresponding to the QoS information from the base station in operation 1005. The SLRB configuration corresponds to Table 5 through Table 5.

If determining that the QoS information of the V2X service is not supported based on information of the V2X SIB message transmitted by the base station, the UE1 may use pre-configured SLRB configuration corresponding to the QoS information.

Referring to FIG. 10B, the UE in RRC_INACTIVE or RRC_IDLE may receive a V2X SIB message from the base station in operation 1011. The V2X SIB message may include service availability indication. If determining that the QoS information of the V2X service to be provided via the base station is supported according to the service availability indication of operation 1011, the UE1 may apply the SLRB configuration corresponding to the QoS information of the V2X SIB message. If determining that the QoS information of the V2X service is not supported based on the information of the V2X SIB message transmitted by the base station, the UE1 may use pre-configured SLRB configuration corresponding to the QoS information.

Referring to FIG. 10C, the UE may acquire QoS information provided by the system in operation 1021. In operation 1023, the UE may determine whether the system provides an intended V2X service, based on the information acquired in operation 1021. According to an embodiment of the disclosure, whether the system provides the intended V2X service corresponds to whether the system is able to set the SLRB configuration satisfying QoS requirements of the V2X service. If the V2X service is available from the system according to the determination of operation 1023, the UE acquires SLRB configuration from the system and receives the V2X service by applying the SLRB configuration in operation 1025. If the V2X service is not available from the system according to the determination of operation 1023, the UE acquires pre-configured SLRB configuration and receives the V2X service by applying the SLRB configuration in operation 1027.

Figure 11:
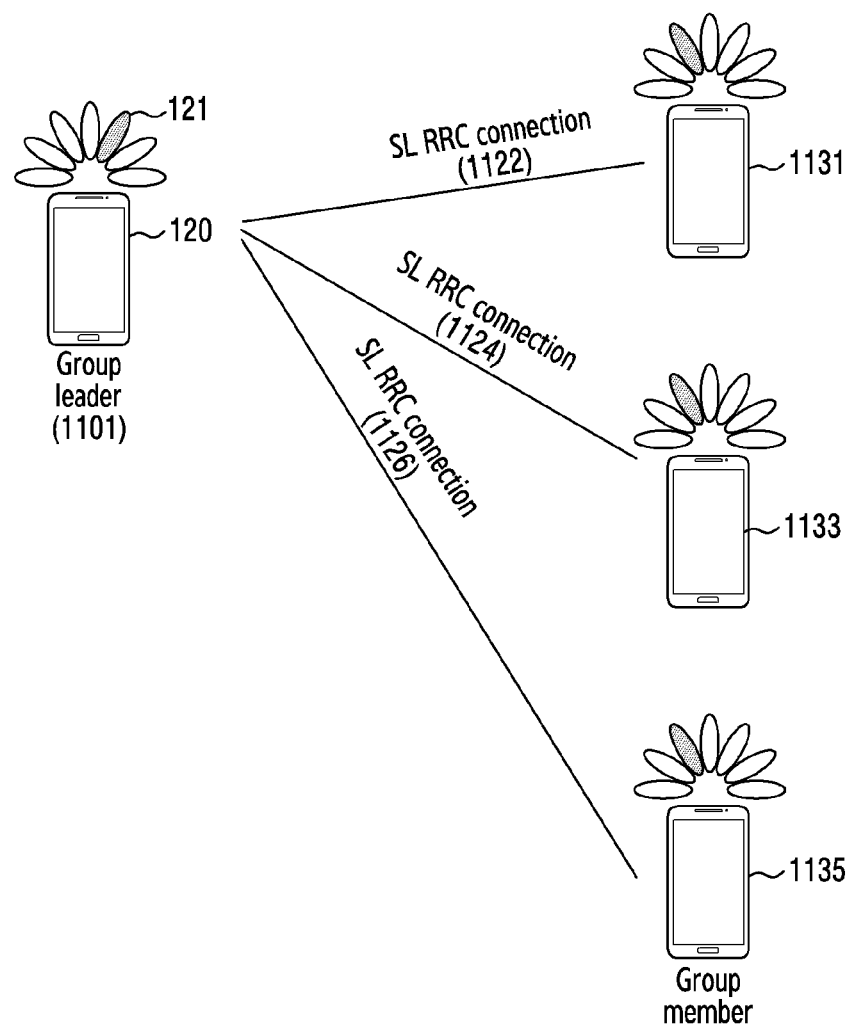
FIG. 11 illustrates a scenario of SLRB configuration for groupcast direct communication between UEs according to various embodiments of the disclosure.

FIG. 11 illustrates a scenario of SLRB configuration for groupcast direct communication between UEs according to various embodiments of the disclosure.

Referring to FIG. 11, in the groupcast direct communication between UEs, a UE which is a group member may perform a one-to-one unicast sidelink connection establishment procedure with other UE of a corresponding group. A group leader UE 1101 may have sidelink RRC connection establishments 1122, 1124, and 1126 with group member UEs 1131, 1133, and 1135.

The sidelink RRC connection establishment and connection release procedures may be identical to the unicast sidelink connection establishment and connection release procedures. The group may include a group leader and a group member, and the sidelink RRC connection establishment and connection release may be performed between the group leader and the group member. The sidelink RRC connection establishment and connection release of the groupcast may be performed between members. Management of the sidelink RRC link in the groupcast may be identical to unicast sidelink management. If the sidelink RRC connection is configured between the group leader and the group member, the sidelink RRC connection may be managed using a keep alive message between the group leader and the group member. If the sidelink RRC connection is configured between members of the group, the sidelink RRC connection may be managed using the keep alive message between the members.

In so doing, the sidelink unicast and the sidelink groupcast may differ in the following information.

sidelink unicast: use unicast destination ID, unicast source ID sidelink groupcast: use groupcast destination ID, groupcast source ID The sidelink RRC for the groupcast may be used to configure or reconfigure the SLRB configuration corresponding to the QoS information to be used by the UE of the group. According to an embodiment of the disclosure, the SLRB configuration may be performed on each member in the sidelink RRC connection establishment for the groupcast between the members, or may be performed on every group member all at once after the sidelink RRC connection establishment for the groupcast between the members. The former method may be used if the group is dynamically formed (e.g., dynamic group start application: the group includes traffic lights installed at an intersection and a vehicle moving at corresponding traffic lights), and the latter method may be used if the group is pre-formed (e.g., platooning application).

Figure 12A:
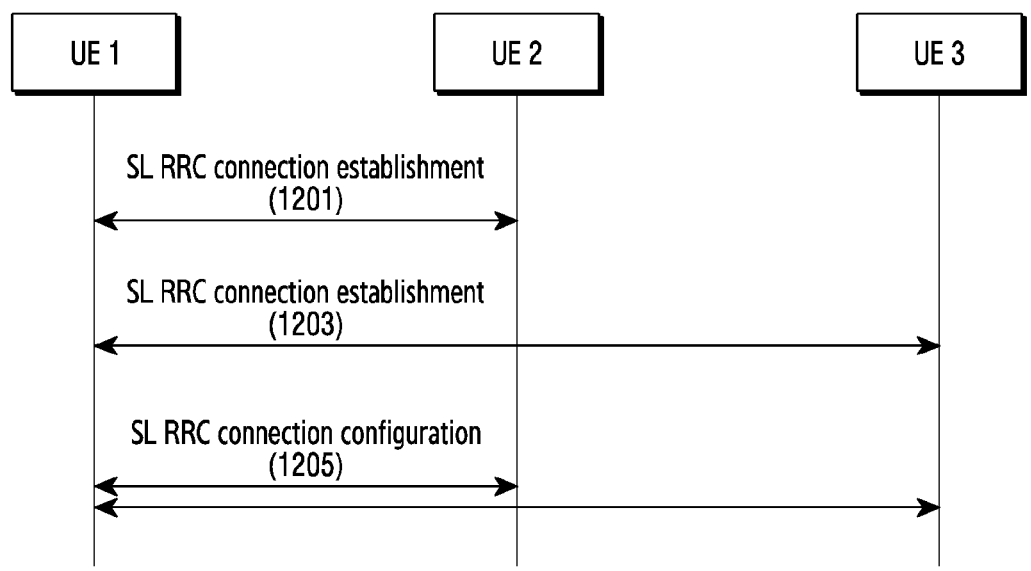
FIG. 12A illustrates signal flows of SLRB configuration for groupcast direct communication between UEs according to various embodiments of the disclosure.
Figure 12B:
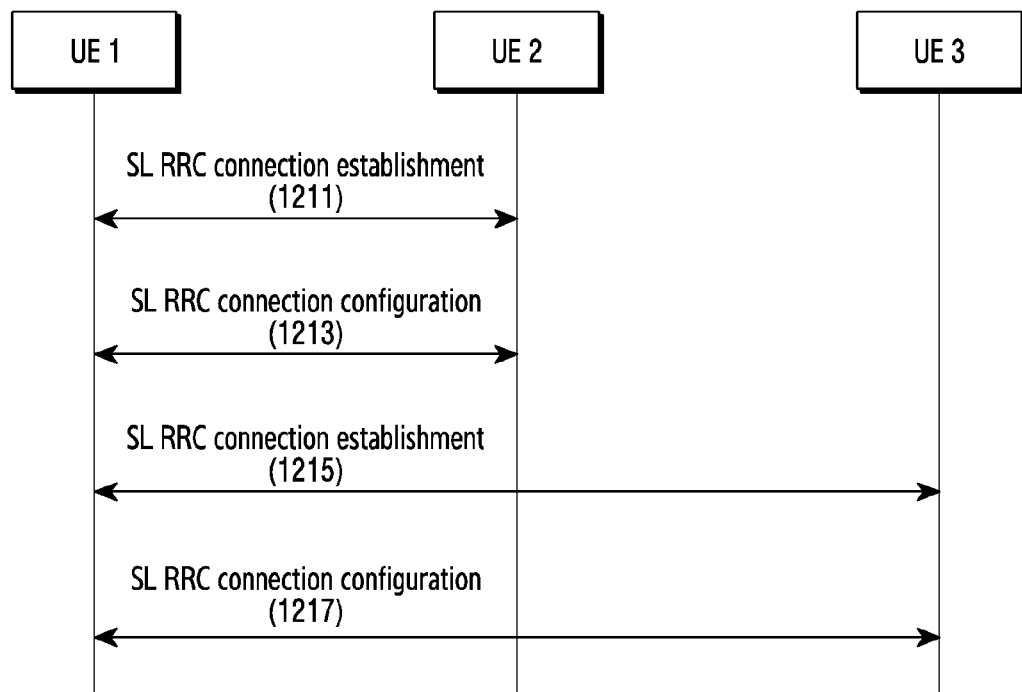
FIG. 12B illustrates signal flows of the SLRB configuration for the groupcast direct communication between the UEs according to various embodiments of the disclosure.
Figure 12C:
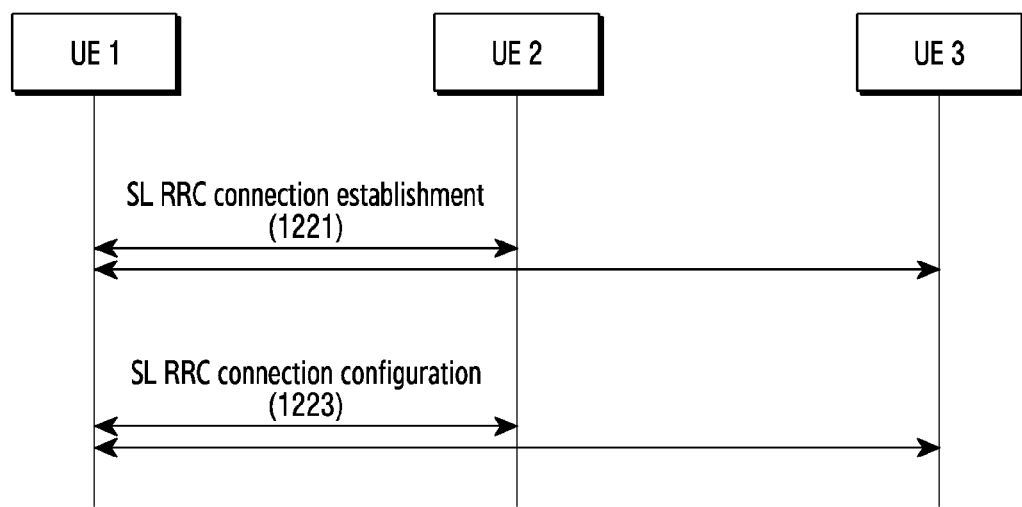
FIG. 12C illustrates signal flows of the SLRB configuration for the groupcast direct communication between the UEs according to various embodiments of the disclosure.

FIGS. 12A, 12B, and 12C illustrate signal flows of SLRB configuration for groupcast direct communication between UEs according to various embodiments of the disclosure.

Referring to FIG. 12A, UE1, UE2, and UE3 belong to the same group. The UE1 may perform sidelink RRC connection establishment with the UE2 in operation 1201, and the UE1 may perform sidelink RRC connection establishment with the UE3 in operation 1203. If the sidelink RRC connection establishment between the member UEs are completed, sidelink RRC SLRB configuration including SLRB configuration to be used by the member UEs may be performed in the sidelink groupcast in operation 1205. In operation 1205, a group leader UE may transmit RRC Connection (re)Configuration and a group member UE may transmit RRC Connection (re)Configuration complete.

Referring to FIG. 12B, the UE1, the UE2, and the UE3 belong to the same group. The UE1 may perform sidelink RRC connection establishment with the UE2 in operation 1211. In operation 1213, the UE1 may perform sidelink RRC connection configuration including the SLRB configuration to be used by the member UEs, with the UE2. The UE1 may perform sidelink RRC connection establishment with the UE3 in operation 1215. In operation 1217, the UE1 may perform sidelink RRC connection configuration including the SLRB configuration to be used by the member UEs, with the UE3. In operations 1213 and 1217, the group leader UE may transmit RRC Connection (re)Configuration and the group member UE may transmit RRC Connection (re) Configuration complete.

Referring to FIG. 12C, the UE1, the UE2, and the UE3 belong to the same group. The UE1 may perform sidelink RRC connection establishment with the UE2 and the UE3 in operation 1221. In operation 1223, the UE1 may perform sidelink RRC connection configuration including SLRB configuration to be used by the member UEs, with the UE2 and the UE3. In operations 1221 and 1223, sidelink RRC signaling may be transmitted using group information, for example, group destination ID acquired in grouping the UE1, the UE2, and the UE3. The groupcast sidelink RRC (setting, release, management, SLRB configuration, SLRB reconfiguration) signaling may be transmitted using the group information according to the embodiment of FIG. 12C.

The information used to form the groupcast group may include at least one of group destination ID, group source ID, and QoS Info (VQI), and the QoS information corresponds to Table 1 through Table 4.

According to an embodiment of the disclosure, a method for differentiating sidelink resource acquisition for sidelink RRC signaling and sidelink resource acquisition for sidelink data transmission is provided.

In the SLRB configuration for the sidelink resource acquisition, SL configuration and SL BSR configuration may be set with different priorities between the sidelink RRC signaling and the sidelink data. The sidelink RRC signaling is set to a logical channel group 0 and may use the configuration of the logical channel group 0 in the SL configuration and the SL BSR configuration. The sidelink data is set to other value than the logical channel group 0 and may use other configuration than the logical channel group 0 in the SL configuration and the SL BSR configuration.

As set forth above, an apparatus and a method according to various embodiments of the disclosure support a vehicle communication service requiring various QoSs using direct communication between UEs in a vehicle communication system, to thus achieve reliability and low-latency requirement in vehicle communication.

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, local area network (LAN), wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, comprising:
   identifying quality of service (QOS) information for a sidelink (SL) application, wherein the QoS information includes a 5QI value and range information indicating a minimum communication range;
   transmitting, to a base station (BS), sidelink UE information message including the QoS information;
   receiving, from the BS, sidelink radio bearer (SLRB) configuration information;
   transmitting the SLRB configuration information via RRC (radio resource control) message, to another UE in order to perform a sidelink communication; and
   performing the sidelink communication with the another UE based on the SLRB configuration information,
   wherein the SLRB configuration information includes information on a discard timer and information on a packet data convergence protocol (PDCP)-sequence number (SN)-size.

2. The method of claim 1, wherein the SLRB configuration information is received via a radio resource control (RRC) dedicated message or system information block (SIB).

3. The method of claim 1,
   wherein the QoS information further includes at least one of information on a maximum end-to-end latency, information on a reliability, or information on a data rate, and
   wherein the 5QI value indicates a default priority level, packet delay budget, packet error rate, default maximum data burst volume and default averaging window.

4. The method of claim 1, wherein the SLRB configuration information further includes at least one of information on a subcarrier spacing or information on a configured SL grant.

5. The method of claim 1, wherein the SLRB configuration information further includes radio link control (RLC) mode, and
   wherein the RLC mode includes at least one of: RLC AM, RLC UM, or sequence number (SN)-field length.

6. The method of claim 1, wherein the SLRB configuration information further includes information on a logical channel (LCH) priority, information on a prioritized bit rate (PBR) and information on a bucket size duration (BSD).

7. The method of claim 1, further comprising:
   selecting one of unicast, groupcast, or broadcast as a mode for transmitting a service packet required by the SL application.

8. A user equipment (UE) in a wireless communication system, comprising:
   at least one transceiver; and
   at least one processor coupled to the at least one transceiver,
   wherein the at least one processor is configured to:
   identify quality of service (QOS) information for a sidelink (SL) application, wherein the QOS information includes a 5QI value and range information indicating a minimum communication range;
   transmit, to a base station (BS), sidelink UE information message including the QoS information;
   receive, from the BS, sidelink radio bearer (SLRB) configuration information;
   transmit the SLRB configuration information via RRC (radio resource control) message, to another UE in order to perform a sidelink communication; and
   perform the sidelink communication with the another UE based on the SLRB configuration information,
   wherein the SLRB configuration information includes information on a discard timer and information on a packet data convergence protocol (PDCP)-sequence number (SN)-size.

9. The UE of claim 8, wherein the SLRB configuration information is received via a radio resource control (RRC) dedicated message or system information block (SIB).

10. The UE of claim 8,
    wherein the QoS information further includes at least one of information on a maximum end-to-end latency, information on a reliability, or information on a data rate, and
    wherein the 5QI value indicates a default priority level, packet delay budget, packet error rate, default maximum data burst volume and default averaging window.

11. The UE of claim 8, wherein the SLRB configuration information further includes at least one of information on a subcarrier spacing or information on a configured SL grant.

12. The UE of claim 8, wherein the SLRB configuration information further includes radio link control (RLC) mode, and
    wherein the RLC mode includes at least one of: RLC AM, RLC UM, or sequence number (SN)-field length.

13. The UE of claim 8, wherein the SLRB configuration information further includes information on a logical channel (LCH) priority, information on a prioritized bit rate (PBR) and information on a bucket size duration (BSD).

14. The UE of claim 8, wherein the at least one processor is further configured to:
  select one of unicast, groupcast, or broadcast as a mode for transmitting a service packet required by the SL application.

15. A base station (BS) in a wireless communication system comprising:
  at least one transceiver; and
  at least one processor coupled to the at least one transceiver,
  wherein the at least one processor is configured to:
  receive, from a user equipment (UE), sidelink (SL) UE information message including quality of service (QOS) information, wherein the QoS information includes a 5QI value and range information indicating a minimum communication range; and
  transmit, to the UE, sidelink radio bearer (SLRB) configuration information, wherein the SLRB configuration information is transmitted via RRC (radio resource control) message, to another UE in order to perform a sidelink communication by the UE,
  wherein the SLRB configuration information includes information on a discard timer, and information on a packet data convergence protocol (PDCP)-sequence number (SN)-size.

16. The BS of claim 15, wherein the SLRB configuration information is received via a radio resource control (RRC) dedicated message or system information block (SIB).

17. The BS of claim 15,
  wherein the QoS information further includes at least one of information on a maximum end-to-end latency, information on a reliability, or information on a data rate, and
  wherein the 5QI value indicates a default priority level, packet delay budget, packet error rate, default maximum data burst volume and default averaging window.

18. The BS of claim 15, wherein the SLRB configuration information further includes at least one of information on a subcarrier spacing or information on a configured SL grant.

19. The BS of claim 15, wherein the SLRB configuration information further includes radio link control (RLC) mode, and
  wherein the RLC mode includes at least one of: RLC AM, RLC UM or sequence number (SN)-field length.

20. The BS of claim 15, wherein the SLRB configuration information further includes information on a logical channel (LCH) priority, information on a prioritized bit rate (PBR) and information on a bucket size duration (BSD).

* * * * *